(12) United States Patent
Phély

(10) Patent No.: US 12,370,841 B2
(45) Date of Patent: Jul. 29, 2025

(54) KIT FOR FORMING AN AGRICULTURAL TOOL FROM A WHEEL BODY OR TUBULAR SUPPORT

(71) Applicant: OTICO, Chalmaison (FR)

(72) Inventor: Olivier Phély, Chalmaison (FR)

(73) Assignee: OTICO, Chalmaison (FR)

( * ) Notice: Subject to any disclaimer, the term of this patent is extended or adjusted under 35 U.S.C. 154(b) by 854 days.

(21) Appl. No.: 17/451,059

(22) Filed: Oct. 15, 2021

(65) Prior Publication Data
US 2022/0118802 A1    Apr. 21, 2022

(30) Foreign Application Priority Data
Oct. 16, 2020   (FR) ...................................... 20 10675

(51) Int. Cl.
| | | |
|---|---|---|
| *B60C 15/028* | (2006.01) | |
| *A01C 7/20* | (2006.01) | |
| *B60C 17/06* | (2006.01) | |

(52) U.S. Cl.
CPC ............ *B60C 15/028* (2013.01); *A01C 7/203* (2013.01); *B60C 17/06* (2013.01); *B60C 2200/08* (2013.01)

(58) Field of Classification Search
CPC . B60C 15/028; B60C 17/06; B60C 2017/063; B60C 2200/08; A01C 7/203
USPC .......................................... 152/520; 111/135
See application file for complete search history.

(56) References Cited

U.S. PATENT DOCUMENTS

| | | | | |
|---|---|---|---|---|
| 4,327,791 A | * | 5/1982 | Strader .................. | B60B 25/002 |
| | | | | 152/401 |
| 4,733,730 A | * | 3/1988 | Murray .................. | A01C 5/068 |
| | | | | 172/519 |
| 5,022,450 A | * | 6/1991 | Weeks ................... | B60C 17/041 |
| | | | | 152/381.6 |
| 2011/0162774 A1 | | 7/2011 | Marsaly et al. | |
| 2016/0129729 A1 | | 5/2016 | Piou | |

FOREIGN PATENT DOCUMENTS

| | | |
|---|---|---|
| CA | 2 727 643 A1 | 12/2009 |
| EP | 0 159 274 | 10/1985 |
| FR | 2 579 527 A2 | 10/1986 |
| FR | 3 028 136 A1 | 5/2016 |

OTHER PUBLICATIONS

French Preliminary Search Report issued Jul. 1, 2021 in French Application 20 10675 filed on Oct. 16, 2020, 3 pages (with English Translation of Categories of Cited Documents).

* cited by examiner

*Primary Examiner* — Tara Mayo

(74) *Attorney, Agent, or Firm* — Oblon, McClelland, Maier & Neustadt, L.L.P.

(57) ABSTRACT

An agricultural tool includes a wheel body and a flexible tire with a hollow chamber and an inner surface around this hollow chamber; a circular opening on the chamber; a pair of beads bordering this opening; and a spacer at least partially tubular with two axially opposite end faces. Over one portion corresponding to one of the beads, the inner surface extends frustoconically by widening radially outward of the flexible tire, and one of the end faces of the spacer has an axially protruding surface. The spacer is placed across the opening of the tire such that the protruding surface engages the inner surface in an area of the portion corresponding to the bead.

19 Claims, 19 Drawing Sheets

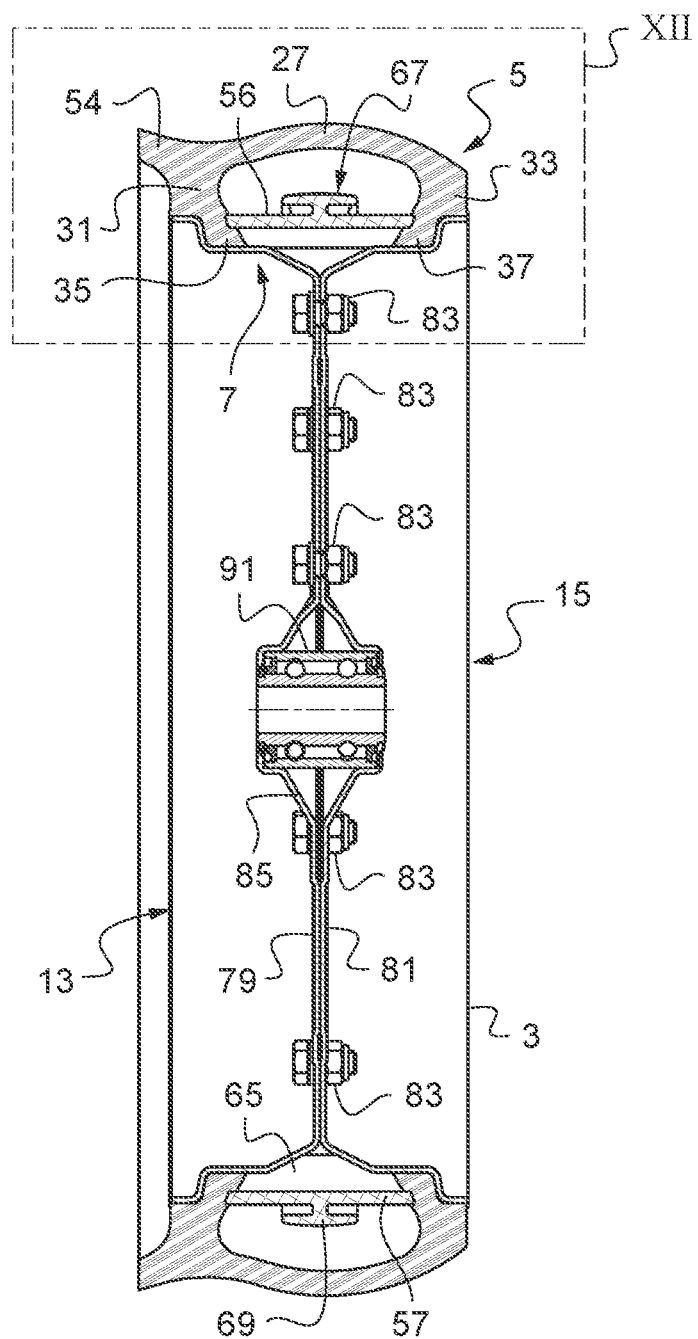

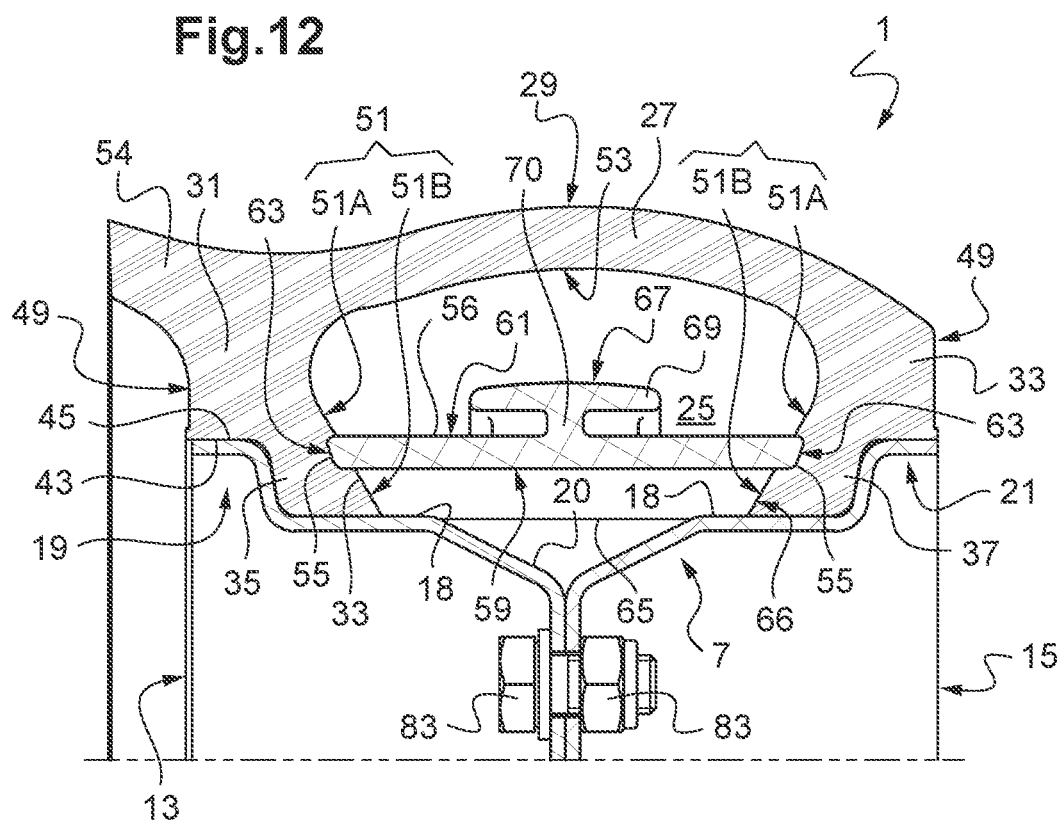

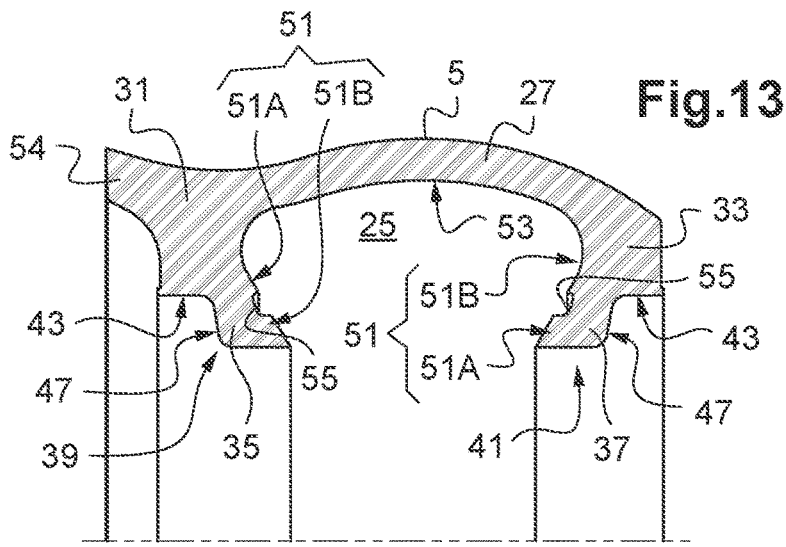
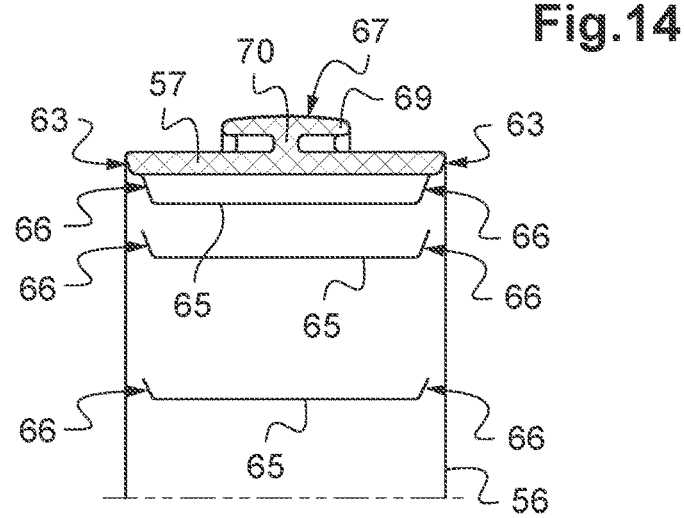
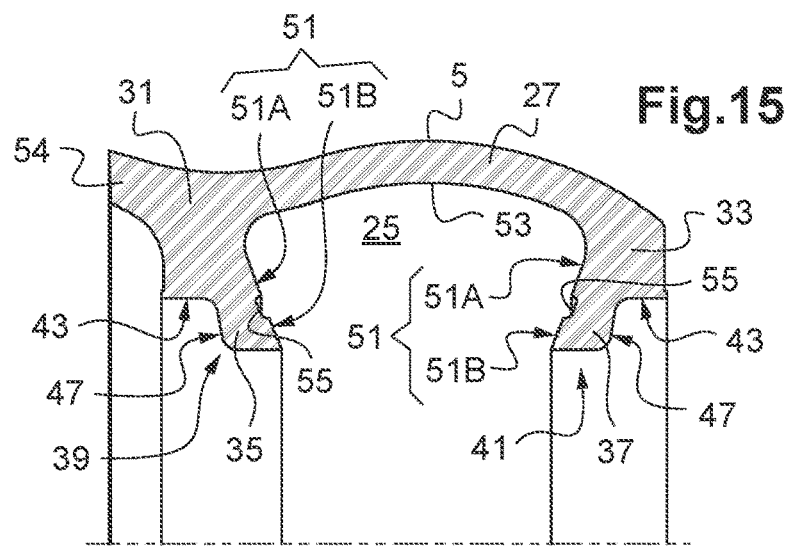

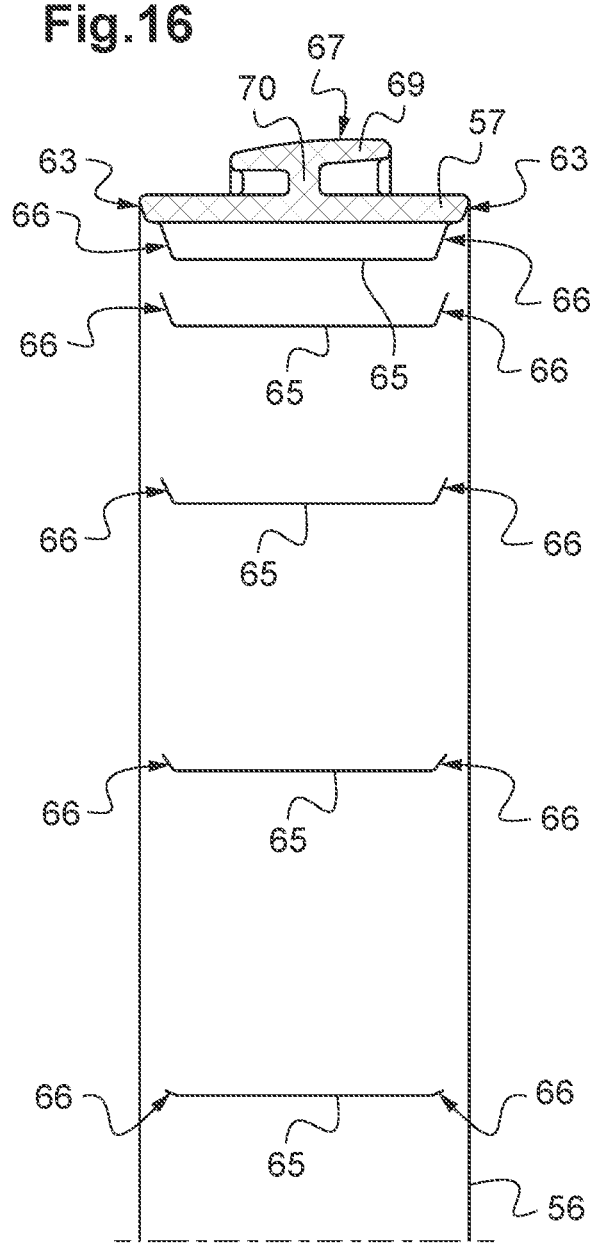

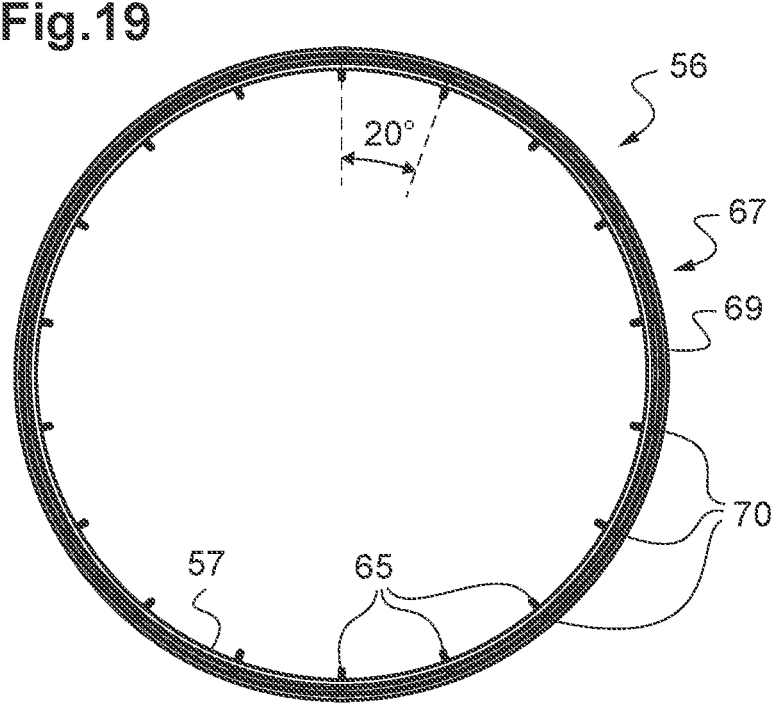
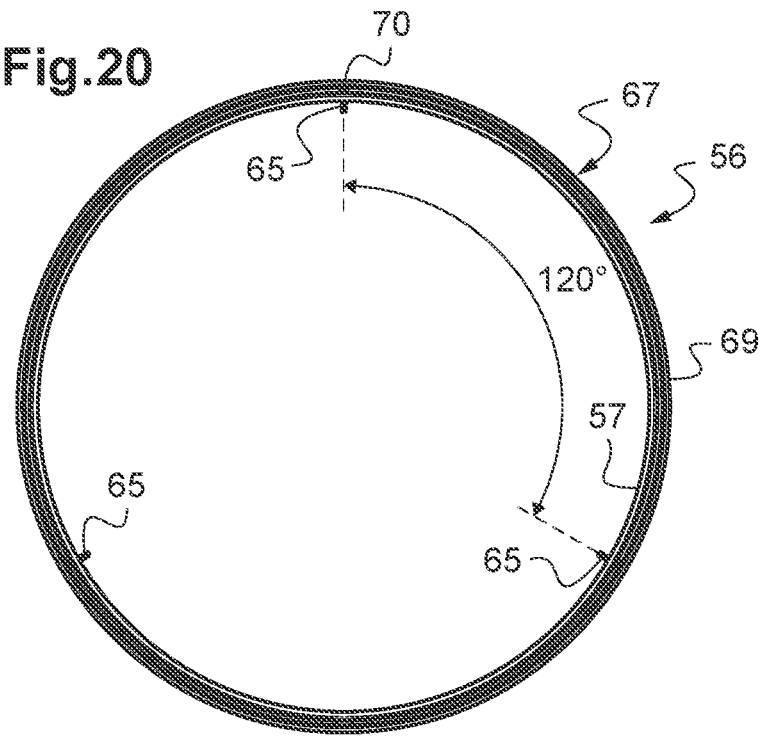

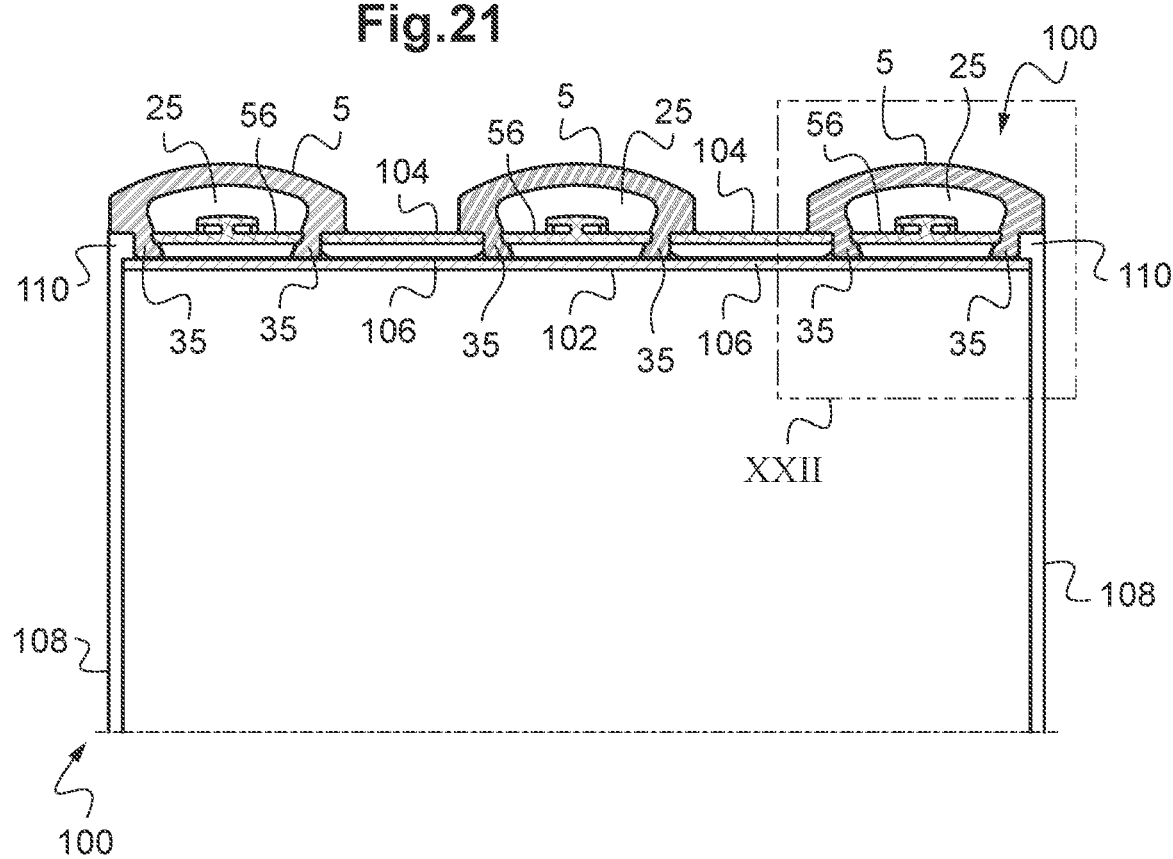
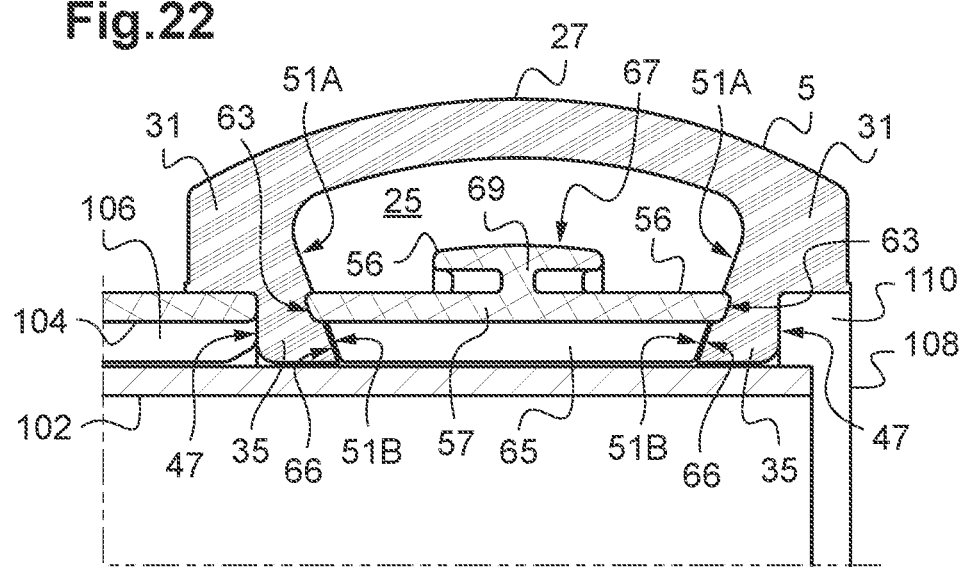

KIT FOR FORMING AN AGRICULTURAL TOOL FROM A WHEEL BODY OR TUBULAR SUPPORT

BACKGROUND OF THE INVENTION

Field of the Invention

The invention relates to a kit intended to form an agricultural tool from a wheel body or a tubular support, the kit comprising a flexible tire having a hollow chamber and an inner wall that delimits this hollow chamber, the flexible tire further having a circular opening on the hollow chamber and a pair of beads that borders this circular opening and by means of which the flexible tire is mounted around the wheel body or the tubular support.

Description of the Related Art

Agricultural tools in wheel form are known, this wheel comprising a body of revolution and a hollow and flexible tire mounted on the periphery of the wheel body. A wheel forming a tool of this type is used particularly in certain machines for working the fields. These machines are generally towed and of mounted or semi-mounted type.

In agricultural machines of this type, a tool for working the soil, such as a plough share, a plough disc or a time, creates a furrow intended to receive grains or seeds. The furrow is subsequently closed up again to enable germination of these seeds.

A wheel tool may be used in combination with a seeder element in order to adjust the working depth thereof. This is then referred to as gauge wheel. A wheel tool may also be used to tamper the soil after the passage of this element, as is the case of so-called "tamper" wheels.

The body of the wheel is fairly rigid, which makes it possible to transmit the forces necessary for working the soil. The flexible tire is produced in such a way that its tire cover deforms during the work, which encourages the detachment of the soil and prevents the tire from fouling. Most of the time, the tire is manufactured from elastomer and is used uninflated, that is to say that the inside of its tire cover is in fluidic communication with the outside thereof.

Historically, at least two types of flexible tires are distinguished for use in an agricultural wheel. According to a first type, the tire is made from a pneumatic tire, typically by retreading a motor vehicle tire. The flexible tire then has a tire cover the profile of which is open on the inner face of the tire. The tire is mounted on the wheel body by means of beads, which each form the terminal area of a respective sidewall. The tire comprises metal reinforcements, in the form of rods, in the beads because the pneumatic tire of which it is from requires reinforcements of this type for its pneumatic function. These rods stiffen the tire and help to hold it on the wheel body.

In EP 0 223 134 B2 and EP 0 245 648 B2, pneumatic tires of lorries are mounted on a tubular support in order to form a roller for agricultural use. These tires are held on the support thanks to a pair of blocking rings, which are mounted on the support, inside the opening and close to the beads of the tire, and a tensioner mechanism, that is actuated to move these rings apart from one another and tighten the beads of the tire against edges of the support.

During use, agricultural tires from pneumatic tires prove to be not very deformable, mainly due to the stiffness of the pneumatic tires that they come from.

According to a second type of tire, the tire cover has on the contrary a closed profile a portion of which, the sole, connects the sidewalls to one another opposite the tread. The tire is mounted on the wheel body by means of this sole. This is then a tire specifically designed and produced for agricultural use, which has the advantage of deforming more than the tires from pneumatic tires. Such a tire is manufactured from an elastomer profile section that is closed back on itself into a strip that is baked in a mould. An example of tire of this type is described in FR 3 004 384 A1.

For some time already, particularly at the initiative of the Applicant, another type of tire has emerged, wherein the tire cover is formed directly by injecting elastomer material into a mould.

The manufacture of tires by injection is particularly advantageous, in that it requires fewer manual interventions and is accompanied by less scrap than a manufacture based on the extrusion of a profile. Injection manufacturing is also faster.

Nevertheless, this injection manufacturing involves substantially modifying the profile of the tire cover in relation to extruded tires. Indeed, it is very difficult to produce closed-profile tire covers and, more generally, particular attention must be paid, during the designing of the tire, to the inner face thereof. Among other things, the tire must be able to be removed easily from the core of the mould after baking.

In this context, the Applicant designed a tire for agriculture use of which a portion of the preform corresponding to the sole is produced in two separate portions, each attached to a respective sidewall. These portions may be spaced apart from one another to facilitate the demoulding of the preform. They are joined and assembled by cooperation of shape to constitute the sole of the tire. A portion that protrudes radially inward of the tire, in the manner of a bead, helps to fasten this tire to the wheel body. In particular, this bead may be jammed between two homologous flanges forming the wheel body.

In FR 3 028 136 A1, the Applicant went further by proposing a tire devoid of a sole. The proposed tire comprises a generally annular tire cover with two portions forming sidewalls and one portion forming the tread connecting the sidewalls to one another. The tire cover has an opening opposite to the tread. The wheel body comprises a pair of flanges and a disc-shaped spacer, inserted between these flanges and fastened to the latter. The tire is mounted on the wheel body in such a way that the spacer is disposed across its opening, whereas the flanges are arranged in such a way as to block the sidewalls of the tire cover against the spacer, at least in the vicinity of the opening. For this, the ends of the sidewalls are shaped according to a nose profile and cooperate with edges of the flanges of complementary shape.

In the absence of sole on the tire, FR 3 028 136 proposes in a way to modify the wheel body in relation to a conventional body in order to ensure holding of the tire.

This holding is particularly important, because during work, the tool is subjected to difficult conditions, related for example to a rapid forward motion of the machine or uneven, or even hilly, ground. Furthermore, due to the fact that the tool may have to work in a direction that may be skew in relation to the direction of forward motion or take bends, it often exerts forces on the tire that tend to take the tire off its rim, that is to say make it leave the seat of the wheel body.

This difficulty is overcome in the agricultural tires from pneumatic tires due to rods integrated into the beads. Yet, it is not desired to equip the tires injected with rods of this type in order to maintain the capacity of these tires to demould easily and to deform during the work.

Similar considerations are found in the case of an agricultural tool in roller form, comprising a tubular support and a plurality of flexible tires mounted on this support, this plurality of tires being inserted between two flanges that are each mounted at a respective end of the support.

The agricultural wheel of FR 3 028 136 globally gives satisfaction. The Applicant desired to go even further and set themselves the objective of providing an open profile tire that can be easily mounted on a wheel body or a conventional tubular support, the rim or the end flanges of which are provided with noses, and more generally with portions protruding axially inward of a radially more inner portion of this tire.

BRIEF SUMMARY OF THE INVENTION

To this end, a kit is proposed intended to form an agricultural tool from a wheel body or a roller support, this kit comprising a flexible tire having a hollow chamber and an inner surface around this hollow chamber. The flexible tire further having a circular opening on the hollow chamber and a pair of beads bordering this circular opening and by means of which the flexible tire is mounted around the wheel body or the roller support. The kit further comprises a spacer at least partially tubular with two axially opposite end faces. At least over one portion corresponding to at least one of the beads, the inner surface extends generally frustoconically, by widening radially outward of the flexible tire. One at least of the end faces of the spacer has at least one axially protruding surface. The spacer is shaped in such a way as to be placed across the flexible tire in such a way that the protruding surface is able to engage the inner surface in an area of said portion corresponding to the bead. The proposed kit makes it possible to easily produce a wheel for agricultural use or a roller from a wheel body or from a conventional roller support, at least in the agricultural field.

The spacer may be installed in the tire prior to mounting the assembly formed of the tire and of this spacer on the wheel body or the roller support. The spacer alone ensures the holding of the tire on the wheel body, without the need for a tensioner mechanism or similar. The beads have a trapezoidal profile at least on their portion disposed inside the spacer that greatly helps to lock the tire on the wheel body or the roller support.

The engagement of the spacer with the inner surface of the tire, at the bead, makes it possible not only to cancel out an axial mounting clearance between the tire and the rim, but also the radial mounting clearance, thanks to the frustoconical shape of this surface. Thus, the belts that are usually shaped in the sole of agricultural tires are replaced.

An agricultural tool is also proposed comprising a wheel body or a roller support, a flexible tire having a hollow chamber and an inner surface around this hollow chamber. The flexible tire further has a circular opening on the hollow chamber and a pair of beads bordering this circular opening and by means of which the flexible tire is mounted around the wheel body or the roller support. The tool further comprises a spacer at least partially tubular with two axially opposite end faces. At least over one portion corresponding to at least one of the beads, the inner surface extends generally frustoconically, by widening radially outward of the flexible tire. One at least of the end faces of the spacer has at least one axially protruding surface. The spacer is placed across the opening of the flexible tire in such a way that the protruding surface engages the inner surface in an area of said portion corresponding to the bead.

BRIEF DESCRIPTION OF THE SEVERAL VIEWS OF THE DRAWINGS

Other features and advantages of the invention will become apparent upon reading the following detailed description, made in relation to the appended drawings wherein:

FIG. 11 shows the wheel of FIG. 8, sectional view along a line XI-XI;

FIG. 12 shows a detail XII of FIG. 11;

FIG. 13 shows a portion of a tire of the wheel of FIGS. 8 to 12, alone and sectional view along the line XI-XI;

FIG. 14 shows a portion of a spacer of the wheel of FIGS. 8 to 12, alone and sectional view long the line XI-XI;

FIG. 15 shows a variant of the tire of FIG. 13;

FIG. 16 shows a portion of a spacer of the wheel of FIGS. 5 and 6, along and in a view similar to FIG. 5;

FIG. 19 shows the spacer of FIG. 14 front face;

FIG. 20 shows a variant of the spacer of FIG. 19;

FIG. 21 shows a roller according to the invention, longitudinal sectional view;

FIG. 22 shows a detail XXII of the roller of FIG. 21;

DETAILED DESCRIPTION OF THE INVENTION

Figure 1:
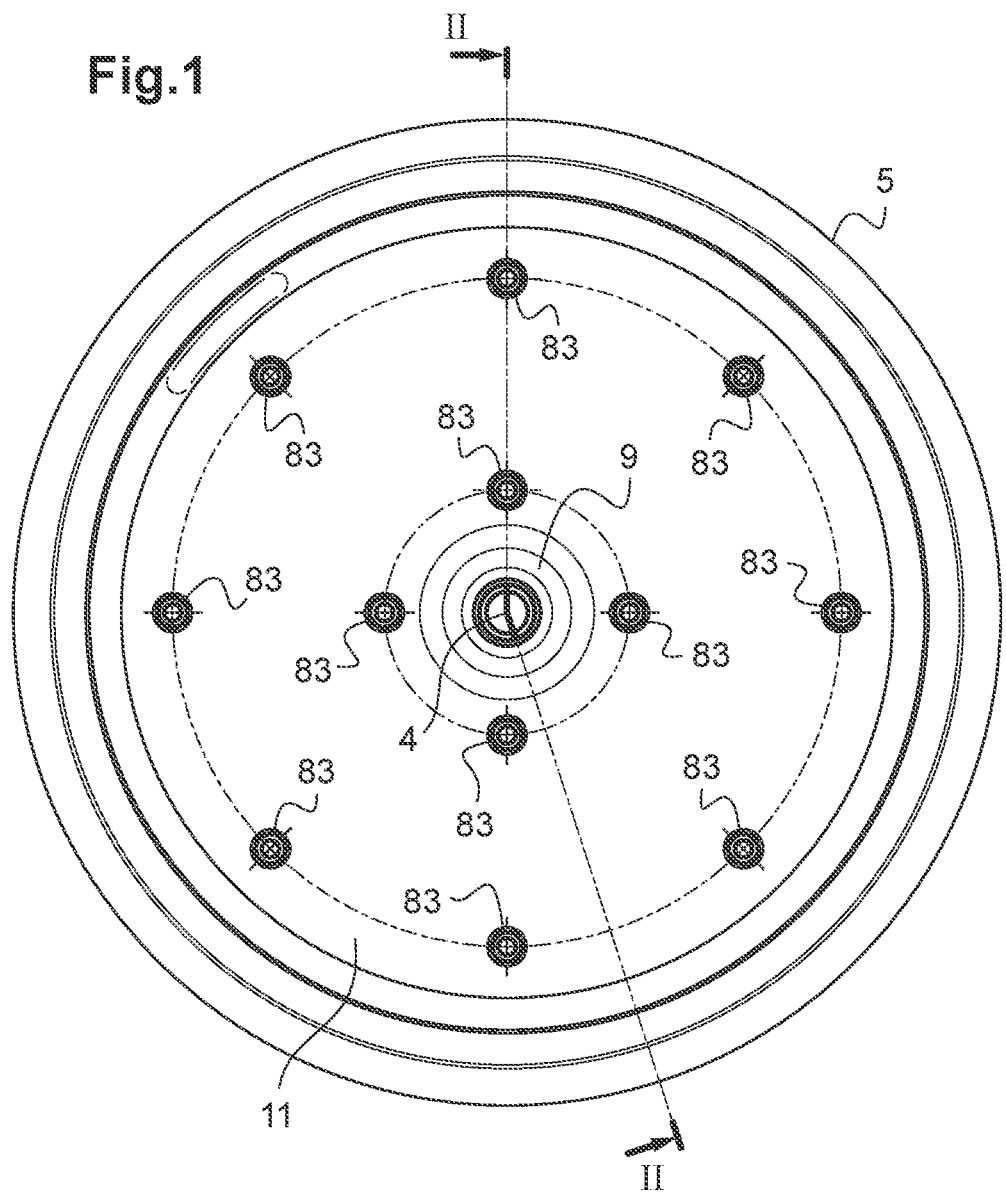
FIG. 1 shows a wheel according to the invention, front face.

The drawings and the following description mainly contain elements of certain character. Therefore, not only may they be used to better understand the present invention, but also to help to define it, if necessary.

Reference is made to FIGS. 1 to 4.

An agricultural tool, intended to work fields, is shaped as a wheel 1. This wheel 1 comprises a body 3 having a general appearance of revolution, about an axis that coincides with a central axis 4 of the wheel 1. The wheel 1 is equipped with a flexible tire 5 mounted around the body 3. This tire 5 has a revolution shape a central axis of which coincides with the central axis 4 of the wheel 1 when the tire 5 is mounted on the body 3.

Here, the "body" or "wheel body" is the practically not deformable, or rigid, portion of the wheel 1, as opposed to its essentially deformable, or flexible, portion, that constitutes the tire 5.

The tire 5 has a radially outer peripheral face intended to come into contact with the soil and a radially inner peripheral face, opposite to the outer face, by means of which the tire 5 presses against a peripheral portion of the body 3, or rim 7.

The "rim" or "wheel rim" is the peripheral portion of the body 3 intended particularly to support the tire 5. The "hub" or "wheel hub" is the central portion of the body 3 by means of which the wheel is mounted, in rotation, on an axis. The rest of the body 3, in particular the portion of this body 3 that connects the hub to the rim 7 may be called "disc", "wheel disc", "dish", or also "wheel dish". The body 3 thus essentially consists of the rim 7, of a hub 9 and of a disc 11.

As opposed to the use that is sometimes made thereof, the term "rim" does not designate here all of the body 3.

The body 3 is of conventional design. This body 3 has a first lateral face, or interior face 13, and a second lateral face, axially opposite to the first, or exterior face 15. In the example illustrated here, where the wheel 1 is intended to be used, in combination with a seeder disc, as a gauge, the interior face 13 corresponds to the face of the wheel 1 directed towards this disc.

The rim 7 has an appearance of revolution about the central axis of the body 3. The rim 7 comprises a large middle portion 17 an axial section of which offers a pair of seat surfaces 18 to the tire 5. The rim 7 has a first edge, or interior edge 19, that borders the middle portion 17 on the interior face 13 side of body 3, and a second edge, or exterior edge 21, axially opposite to the first and that borders the middle portion 17 on the exterior face 15 side of the body 3. The middle portion 17 of the rim 7 is essentially cylindrical. The seats 18 are generally cylindrical and axially separated from one another by a portion of the middle portion 17 forming a rim bottom 20. The interior edge 19 and the exterior edge 21 protrude radially from the middle portion 17 of the rim 7. The bottom 20 of the rim 7 is radially recessed from the seats 18.

The tire 5 comprises a flexible tire cover 23 generally toroidal, the axis of which coincides with the central axis of the tire 5. The tire cover 23 partly delimits at least one generally hollow interior space, or chamber 25, open on the inner face of the tire 5. The tire cover 23 comprises a portion radially opposite to the inner face of the tire 5 shaped as a tread 27, by means of which the wheel 1 will be in contact with the ground. This band 27 forms part of the outer face of the tire 5.

Figure 2:
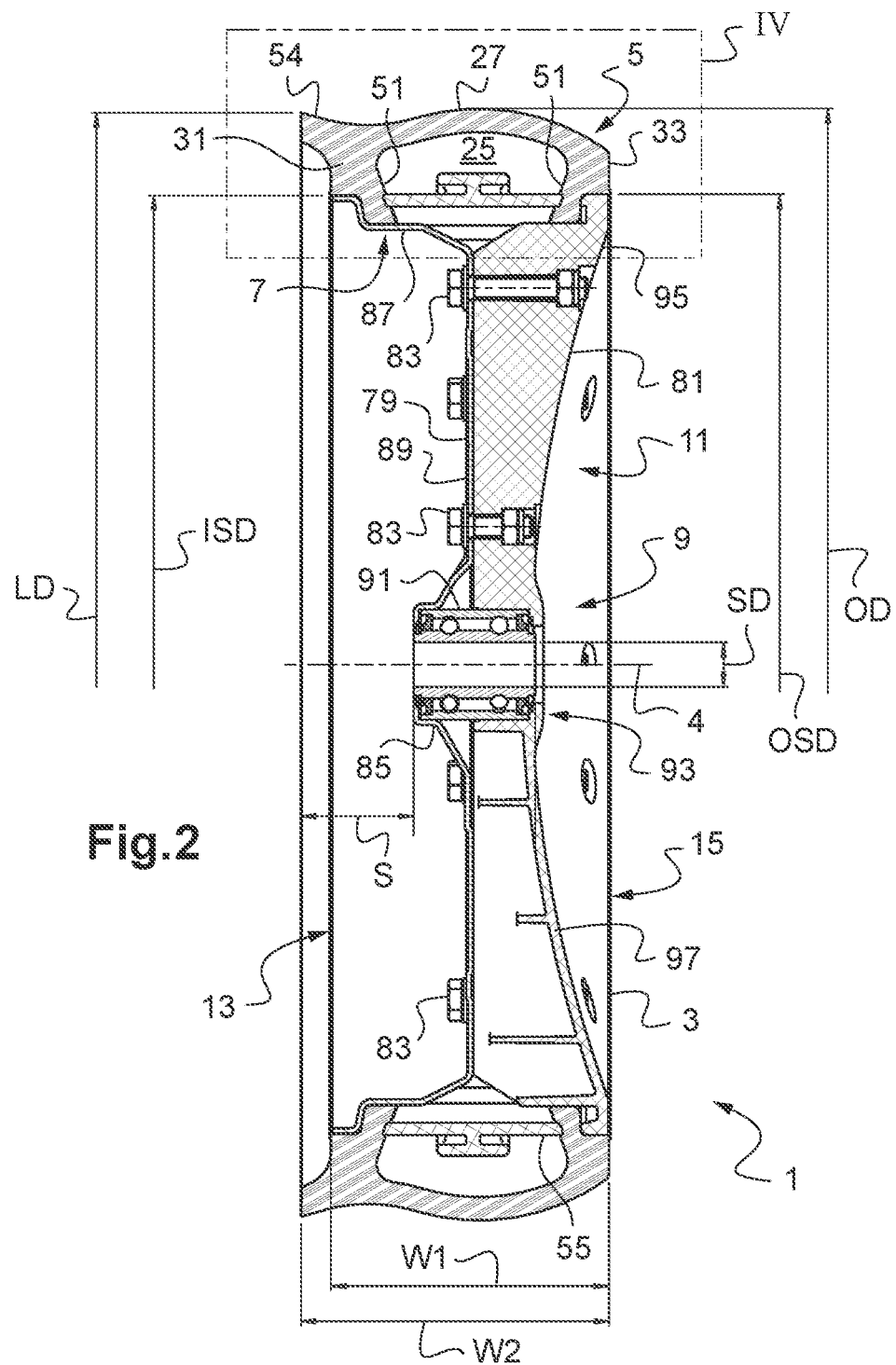
FIG. 2 shows the wheel of FIG. 1, sectional view along a line II-II.
Figure 3:
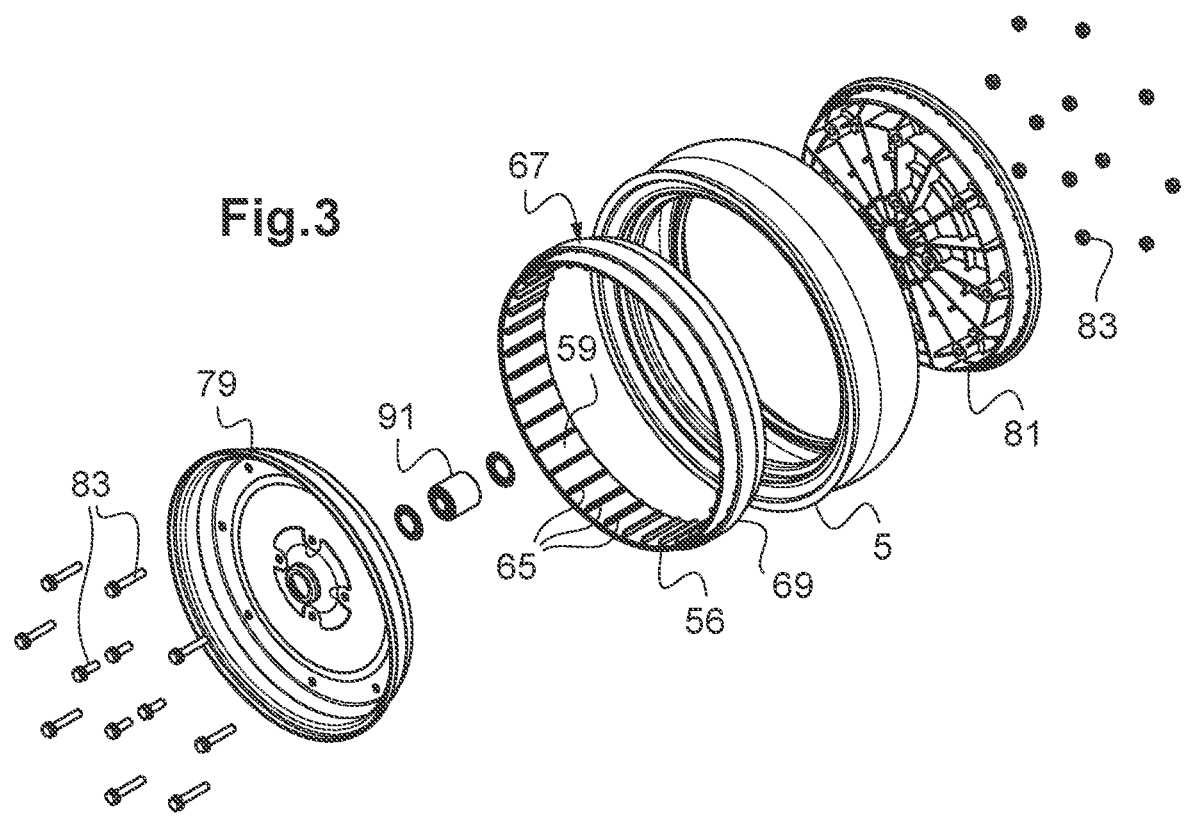
FIG. 3 shows an exploded view of the wheel of FIG. 1.

The tire cover 23 further includes two portions axially opposite one another that form the sidewalls of the tire 5; an interior sidewall 31 near the interior face 13 of the body 3, to the left of the chamber 25 in FIG. 2, and an exterior sidewall 33, near the exterior face 15, to the right. Each of the interior sidewall 31 and of exterior sidewall 33 connects to a respective axial end of the band 27. When we look at the outer face of the tire 5, this band 27 extends according to a generally domed profile, from the interior sidewall 31 to the exterior sidewall 33, with a vertex 29. The distance from the vertex 29 to the central axis of the tire 5 corresponds to the half outside diameter OD of this tire 5. For example, the diameter OD is close to 403 millimetres. Here, the vertex 29 is more or less at equal distance axially from the interior sidewall 31 and from the exterior sidewall 33.

The interior sidewall 31 and the exterior sidewall 33 each extend generally radially, i.e., perpendicular to the central axis of the tire 5. Opposite the band 27, the interior sidewall 31 and the exterior sidewall 33 each extend radially by a portion shaped as a bead, namely an interior bead 35 for the interior sidewall 31 and an exterior bead 37 for the exterior sidewall 33. The interior bead 35 and the exterior bead 37 may be seen as radial ends of the interior sidewall 31 and of the exterior sidewall 33, respectively. These ends are refined in relation to the rest of the interior 31 and exterior 33 sidewalls. The interior bead 35 and the exterior bead 37 each press against a respective seat 18 of the rim 7 by means of a generally cylindrical radial end surface. The interior bead 35 and the exterior bead 37 ensure a contact between the tire 5 and the rim 7 of the body 3. The tire 5 is devoid of metal reinforcement elements, particularly rods, at least in the interior 35 and exterior 37 beads.

The interior bead 35 and the exterior bead 37 border an opening of the chamber 25 on the inner face of the tire 5. The tire 5 is therefore devoid of a sheath, sometimes called "sole", that is to say of a portion of the tire cover 23 connecting the interior sidewall 31 to the exterior sidewall 33 opposite the band 27 and/or essentially extending axially from one end of these sidewalls away from the band 27 inward of the tire 5.

In the absence of sole or similar, the tire cover 23 has a profile widely open on the inner face of the tire 5. This open profile greatly simplifies the manufacturing of the tire 5. The tire cover 23 may be produced by moulding, with injection moulds of simple shape, as opposed to conventional tires the tire cover of which has a closed profile, even partially. The manufacturing of a closed tire cover by injection is accompanied with difficulties related to the demoulding. The tires the tire cover of which has a closed profile are generally manufactured by extrusion of a closed profile band and joined with a portion of this band.

The tire 5 is made of a flexible material, of elastomer type, preferably natural or synthetic rubber, optionally mixed with one another. This material preferably has a Shore hardness between 45 and 75. The tire cover has a significant capacity to deform and return to its initial shape, due to the combination of a flexible material and of the hollow chamber 25. The tire cover deforms particularly when the wheel 1 is working, strained by a reaction force of the soil. This force is exerted mainly radially towards the central axis of the wheel 1. This strongly distinguishes the tire 5 from pneumatic tires, in particular those used for the ground link of motor vehicles.

The open profile of the tire cover 23 and the absence of rods makes it easier to demould the tire 5. This open profile makes it easier to extract the portion of the mould forming the core through the opening of the tire cover 23.

On its inner face, the tire 5 has a first peripheral edge, or interior edge 39, which terminates the interior sidewall 31 and a second peripheral edge, or exterior edge 41, which terminates the exterior sidewall 33. The interior edge 39 and the exterior edge 41 are each shaped in such a way that their shape corresponds respectively to that of the interior edge 19 and of the exterior edge 21 of the rim 7. The interior edge 19 and the exterior edge 21 of the rim 7 thus offer additional seat surfaces to the tire 5, which presses there against by means of its interior 39 and exterior 41 edges.

In particular here, the interior edge 39 and the exterior edge 41 of the tire 5 each comprise a respective edge surface 43, of revolution shape and centred on the axis of this tire 5, intended to rest on a homologous surface 45 of the interior edge 19 and of the exterior edge 21 of the rim 7. The edge surfaces 43 and their homologous surfaces 45 are generally cylindrical. The edge surfaces 43 each terminate radially one of the interior sidewall 31 and of the exterior sidewall 33. The homologous surface 45 of the exterior edge 21 is at a distance from the axis of the body 3 that corresponds to half of the outside seat diameter OSD. For example, the diameter OSD is close to 340 millimetres. The homologous surface 45 of the interior edge 19 is at a distance from the axis of the body 3 that corresponds to a half inside seat diameter ISD. For example, the diameter ISD is close to 340 millimetres.

Here, the interior edge 39 and the exterior edge 41 each further comprise a respective surface of the interior bead 35 and of the exterior bead 37 oriented in such a way opposite to the chamber 25, or exterior surface 47. The exterior surface 47 of the interior bead 35 and that of the exterior bead 37 connect respectively to the edge surface 43 of the interior edge 39 of the tire 5 and to that of the exterior edge 41, here by a fillet.

The exterior surface 47 of the interior bead 35 and that of the exterior bead 37 are in correspondence of shape with one portion at least of the interior 19 and exterior 21 edges of the rim 7. These portions form axial stops 48 against which the interior bead 35 and the exterior bead 37 press in a mainly axial direction.

In the embodiment shown here, the exterior surface 47 of the interior bead 35 is generally frustoconical and widens in a direction radially outward of the tire 5, in a way corresponding to the axial abutment surface 48 of the lower edge 19 of the rim 7. The exterior surface 47 of the exterior bead 37 is generally crown shaped, in a way corresponding to the axial abutment surface 48 of the exterior edge 21 of the rim 7. The interior sidewall 31 and the exterior sidewall 33 each have a surface directed in a way opposite to the chamber 25, or exterior surface 49. The exterior surface 49 of the interior sidewall 31 and that of the exterior sidewall 33 each connect to the edge surface 43 of the interior edge 39 and of the exterior edge 41 of the tire 5, respectively.

The exterior surface 47 of the interior bead 35 and that of the exterior bead 37 connect to the terminal surface of the interior bead 35 and to that of the exterior bead 37, respectively, here by a curve.

Preferably, the seat surfaces 18 and the radial end surfaces of the interior 35 and exterior 37 beads are dimensioned in such a way that there is a slight gap between these surfaces, in particular to make it possible to mount the tire 5 on the rim 7 of the body 3. Such a gap is for example less than 1 millimetre at the diameter.

The tire 5 has an interior surface that surrounds the chamber 25. This surface comprises two portions that form lateral walls 51 of the chamber 25 and a back wall 53 to which the lateral walls 51 connect, here by means of curves. The lateral walls 51 each comprise a first section 51A corresponding to one of the interior sidewall 31 and of the exterior sidewall 33 (at a surface of this sidewall oriented towards the chamber 25) and a second section 51B corresponding to one of the interior bead 35 and of the exterior bead 37 (at a surface of this bead oriented towards the chamber 25) and that extends the first section 51A inward of the tire 5.

The interior surface of the interior sidewall 31 and of the interior bead 35, on the one hand, and the interior surface of the exterior sidewall 33 and of the exterior bead 37, on the other hand, form the lateral walls 51 of the chamber 25. The bottom 53 of this chamber 25 is formed by a surface of the band 27 directed towards the chamber 25.

The lateral walls 51 of the chamber 25 are generally frustoconical, centred on the axis of the tire 5 and widen in the direction radially outward of the tire 5, from the inner face of this tire 5 to the back 53 of this chamber 25. Here, the lateral walls 51 of the chamber 25 are mutually symmetrical in relation to a plane normal to the axis of the tire 5.

In a known manner, the tire 5 has an annular lip 54 that protrudes from the tire cover 23 radially and axially outward of this tire 5. This lip 54 extends substantially along the circumference of the tire 5. The distance from the end of the lip 54 to the central axis of the tire 5 corresponds to a half diameter LD of the lip 54. For example, the diameter LD is close to 400 millimetres. The distance that separates this end of the exterior surface 49 from the exterior sidewall 33 in the axial direction of the tire 5 corresponds to the width W2 of the lip 54. For example, the width W2 is close to 111 millimetres.

On the interior bead 35 and the exterior bead 37, the tire 5 has here each time a respective circular groove 55, centred on the axis of this tire 5 and open on its chamber 25. Each groove 55 is arranged in one of the lateral walls 51 of the chamber 25, on the second section 51B thereof. In other words, on the frustoconical interior surface of the interior 35 and exterior 37 beads.

Here, the grooves 55 are each in a radial position that corresponds to the radially outer limit of the interior bead 35 or of the exterior bead 37. The portion of the tire 5 that is radially beyond a groove 55 corresponds to the interior sidewall 31 or to the exterior sidewall 33.

Radially beyond each groove 55 is the first section 51A of a respective lateral wall 51 of the chamber 25. Radially below each groove 55 is the second section 51B of a respective lateral wall 51 of the chamber 25.

Each lateral wall 51 of the chamber 25 comprises a second section 51B that extends generally frustoconically, by widening radially outward of the tire 5, over one portion at least of the interior bead 35 or of the exterior bead 37, and this portion runs from a circular groove 55 radially inward of the flexible tire 5.

Here, the second sections SIB of the lateral walls 51 of the chamber 5 extend generally frustoconically over their entire respective bead, from the groove 55 up to the radial end of this bead that is in contact with the rim 7. The interior 35 and exterior 37 beads each have a trapezium-shaped profile, here rectangular as regards the exterior bead 37. Furthermore, the first sections 51A of the lateral walls 51 of the chamber 5 here also extend generally frustoconically, from the groove 55 radially outward of the tire 5, in particular up to the back 53 of the chamber 25. In other terms, the lateral walls 51 of the chamber 25 have a pair of frustoconical portions that extend partly at least over the interior 35 and exterior 37 beads, at least over one portion of the latter that is radially outward of the tire 5.

The wheel 1 comprises a revolution part shaped as a spacer 56, which is mounted around the body 3, on the rim 7, across the opening on the chamber 25. The spacer 56 comprises a pair of axial end faces, arranged to face the interior 35 and exterior 37 beads when the spacer 56 is across the opening of the tire 5 on the chamber 25.

These axial end faces of the spacer 56 are arranged in such a way as to engage, partly at least, in the lateral walls 51 of the chamber 25, each time at a second respective section 51B. This engagement results in a penetration of one portion at least of these axial end faces of the spacer 56 into the lateral walls 51. Each axial end face of the spacer 56 has a surface that protrudes axially from this face and by means of which the engagement is carried out. Each protruding surface penetrates the lateral wall 51 of the chamber 25, over a portion thereof corresponding to the beads 35, 37.

This penetration may result from a local deformation (crushing) of the lateral walls 51, in the engagement area, against the protruding surfaces of the spacer 56. Here, the axial ends of the spacer 56, which each support a respective protruding surface, engage in each of the circular grooves 55 of the tire 5. These axial end portions are shaped in a way corresponding to the circular grooves 55, here in trapezia.

It is important that the end portions of the spacer 56 each offer a respective protruding end surface, which makes it possible for the spacer 56 to engage the lateral walls 51, whether or not these are provided with a groove of the type of the circular grooves 55. A protruding end surface exceeds one end face flat and perpendicular to the central axis of the spacer 56 corresponding to a tubular spacer profile.

Once mounted across the opening of the chamber 25, the spacer 56 defines a mutual spacing of the interior bead 35 and of the exterior bead 37 in the axial direction of the tire 5. This spacing is greater than the mutual spacing of the interior 35 and exterior 37 beads at rest. The spacer 56 maintains this spacing.

This spacing is such that before mounting the tire 5 and the spacer 56 on the body 3, the distance that axially separates the exterior surface 47 of the interior bead 35 from that of the exterior bead 37 is greater than the distance that axially separates the axial abutment surfaces 48 intended to receive them on the rim 7.

Once the spacer 56 and the tire 5 have been mounted on the body 3, the spacer 56 helps to establish and maintain a contact of the exterior surface 47 of the interior 35 and exterior 37 beads against a homologous axial abutment surface 48 of the interior 39 or exterior 41 edges of the rim 7. The tire 5 is thus mounted on the rim 7 with an axial stress exerted by the axial abutment surfaces 48 on the interior 35 and exterior 37 beads. This axial stress contributes to the engagement of the end portions of the spacer 56, and of their protruding surfaces, in the lateral walls 51 of the chamber 25, in an area where this wall is frustoconical and widens radially outward of the tire 5.

This ensures the holding of the tire 5 around the body 3. This holding resembles a locking due to the engagement of the spacer 56 in the beads of the tire 5 and of the trapezoidal profile of these beads in their portion taken between the spacer 56 and the seats 18 of the rim 7. Most of the material of the interior 35 and exterior 37 beads is radially below the area of engagement of the spacer 56 with the lateral walls 51.

The spacer 56 has a first axial end segment and a second axial end segment that are shaped in correspondence each with a respective circular groove 55. The profile of the spacer 56 on its first axial end segment corresponds to the profile of one of the grooves 55 whereas the profile of the spacer on its second axial end segment corresponds to the profile of the other grooves 55. The same spacer 56 profile may be used in the absence of groove of the type of the circular grooves 55.

When the body includes two flanges that are mounted one on the other, the tire 5 can be mounted on one of the flanges of the wheel body, for example the second flange 81, once the spacer 55 has been housed in the opening of the tire 5. In particular when the tire 5 is provided with circular grooves of the type of the circular grooves 55, the tire 5 can be mounted on the flange once the spacer 56 has been engaged in the lateral walls 51. One of the interior bead 35 and of the exterior bead 37 presses against one of the seats 18, optionally with a radial clearance related to the mounting. The other flange of the wheel body is subsequently attached, for example the first flange 79, on the first in such a way that the other of the interior bead 35 and of the exterior bead 37 in turn press against the seat 18, optionally with a mounting clearance.

Here, the spacer 56 has a generally tubular main portion 57, the central axis of which coincides with the axis 4 of the wheel 1 once the spacer 56 has been mounted on the body 3. This tubular portion 57 supports the axial end portions of the spacer 56. The axial end portions of the spacer 56 correspond to axial end portions of its main portion 57.

The main portion 57 has a profile generally isosceles trapezium-shaped. A radially interior cylindrical surface 59 of the main portion 57 corresponds to the small base of this trapezium, whereas a radially exterior cylindrical surface 61 corresponds to the large base. The sides of the trapezium are formed of two axial end surfaces 63 that form the protruding surfaces of the ends of the spacer 56. These axial end surfaces 63 are frustoconical, centred on the axis of the spacer 56 and widen radially outward of the latter. The shape of these axial end surfaces 63 corresponds here to the shape of the bottom of the circular grooves 55. The same shape may be used without the circular grooves 55. The inclination of the end surfaces 63 of the spacer 56 relative to a radial direction is close to the inclination of the interior surfaces SI of the inner sidewall 31 and of the outer sidewall 33. Preferably, they have half-angles at the vertex equal to more or less the nearest 5 degrees. Thanks to their protruding shape, these end surfaces 63 act in the manner of wedges and block the beads 35, 37 of the tire 5 against the edges of the rims 7.

The aim is an axial stress resulting from an axial compression of the tire 5, at its beads 35, 37, in the order of 1 to 4 percent, i.e. here for example from 1 to 3 millimetres approximately. To further increase the axial stress applied to the tire 5, it can be envisaged to form the exterior surface 47 of the exterior bead 37 in such a way that it extends frustoconically, by widening radially inward, or according to a profile with a lobe protruding axially outward of the tire 5, while keeping the profile of the axial abutment surface 48 of FIG. 4.

The spacer 56 has a radially inner face by means of which the spacer 56 is mounted on the rim 7. This inner face has a plurality of ribs 65 that protrudes radially inward of the spacer 56, here of the interior surface 59 of the tubular portion 57.

Here, each rib 65 extends in an axial direction of the spacer 56. The latter rests by means of ribs 65 on the rim 7, in particular here on the seats 18. The inside diameter of the ribs 65 corresponds to the inside diameter of the spacer 56 and to the inside diameter of the beads 35 and 37. The seats 18 of the rim 7 are occupied by the interior 35 and exterior 37 beads as well as by the ribs 65 of the spacer 56.

The longitudinal ends 66 of the ribs 65 are recessed from the end faces of the of the spacer 56. The longitudinal ends 66 of the ribs 65 are shaped in a way corresponding to the lateral walls 51 of the chamber 25 on a portion thereof corresponding to the beads 35, 37, particularly radially below the circular grooves 55 or the engagement area of the ends of the spacer 56. The end surfaces 66 of the ribs 65 are here frustoconical and widen radially outward. The inclination of these longitudinal ends 66 relative to a radial direction is close to that of the lateral walls 51, here over a portion thereof radially below the circular grooves 55. The ribs 65 are evenly distributed angularly around the circumference of the inner face of the spacer 56. These ribs 65 mutually delimit free spaces inside of which a portion of the material of the interior 35 and exterior 37 beads flows under the action of the spacer 56. This helps to lock the tire 5 on the rim 7 and to maintain this locking, including in difficult working conditions. The longitudinal ends 66 of the ribs 65 press against the beads 35, 37 such that they contribute to and/or increase the axial compression of the tire 5 at these beads 35, 37. These longitudinal ends 66 help to hold the tire 5 on the rim 7.

One dimension according to the axial direction of the interior surface 59 of the spacer 56 is greater than a minimal dimension in this direction of the opening on the chamber 25, to which is added, if necessary, the depth of the circular grooves 55.

The spacer 56 has here an optional abutment surface 67 for the band 27 and intended to limit the movement thereof when the tire cover 23 deforms. This abutment surface 67 protrudes radially outward of the rest of the spacer 56. This abutment surface 67 is here supported by an annular secondary portion 69 around the main portion 57 and that connects to the exterior surface 61 of the latter. The secondary portion 69 of the spacer 56 protrudes from the main portion 57 thereof, radially outward. This secondary portion 69 connects to the exterior surface 61 of the spacer 55 via a peripheral rib 70 that extends radially. This rib may be discontinuous around the periphery of the secondary portion 69. Here the abutment surface 67 is generally cylindrical and its axis coincides with the central axis of the spacer 55. Axially, this abutment surface is further located in line with the vertex 29 of the band 27.

Other arrangements may be envisaged for the abutment surface 67, for example frustoconical or corrugated.

Here, this abutment surface 67 supports a pressure sensor 71. The sensor 71 is capable of reacting to a contact of a portion radially facing the band 27 by measuring an intensity of force resulting from the soil.

The spacing between the inner sidewall 31 and the outer sidewall 33, i.e. the distance that separates their respective exterior surface in the axial direction, corresponds to the width W of the tire 5.

When a force is exerted on the band 27 mainly directed radially towards the central axis of this tire 5, the tire cover tends to deform in such a way that the band 27 contacts the abutment surface 67. Such a force typically results from the reaction of the soil when the wheel 1 is working.

For example, a thickness of the interior sidewall 31 may be between 10 and 20 millimetres whereas the thickness of the exterior sidewall 33 may be between 10 and 20 millimetres.

The exterior sidewall 33 and the interior sidewall 31 have outside diameters close to one another.

The spacer 56 is rigid. It may be made of synthetic material, for example plastic material, such as polyethylene for example, or metal, such as steel or an aluminium alloy.

Here, the wheel body 3 consists of a first flange 79 and of a second flange 81, each generally disc-shaped. The first flange 79 and the second flange 81 are mounted one on the other to form the wheel body 3. The spacer 56 does not form part of the body 3. This spacer attaches on the body 3 once installed inside the tire 5.

The first flange 79 and the second flange 81 each have a central axis, or axis of revolution. In the assembled state of the wheel body, these axes coincide with the axis 4 of the wheel 1.

The first flange 79 and the second flange 81 each have an inner face, not referenced, and an opposite outer face. The outer face of the first flange 79 and the outer face of the second flange 81 respectively correspond to the inner face 13 and the outer face 15 of the body 3. During the assembly of the first flange 79 and of the second flange 81 one on the other, their inner faces are pressed against one another.

The first flange 79 and the second flange 81 are fastened to one another, here reversibly, by means of a plurality of screw-nut pairs 83. These screw-nut pairs 83 are distributed over the surface of the wheel disc.

The first flange 79 includes a central portion 85, a peripheral portion 87 and a disc 89 connecting the central portion 85 to the peripheral portion 87. Here, the disc 89 is solid. Alternatively, the disc 89 may be perforated and/or comprise one or more arms connecting the central portion 85 of the first flange 79 to the peripheral portion 87 of the latter.

The central portion 85 forms a portion of the hub 9. This central portion 85 is specific to receive an axle or a spindle intended to support the wheel 1 in rotation. The wheel 1 comprises a rotary bearing 91 housed in the central portion 85, here in the form of a double row ball bearing.

The peripheral portion 87 is generally annular-shaped. The peripheral portion 87 supports the interior edge 19 of the rim 7, one adjacent to the interior edge 19, of the seat surfaces 18 and a portion of the bottom 20 of the rim 7. On the outer face side, to the left in FIG. 2, the central portion 85 is disposed recessed in relation to the inner edge of the rim 7. This recess is conventionally close to 40 millimetres.

The first flange 79 is shaped as a one-piece pan. The first flange 7 here is metal, typically steel or aluminium alloy. The first flange 79 is for example obtained by stamping a metal sheet. In particular, the peripheral portion 87 is obtained by folding on itself the peripheral portion of the metal sheet, which gives this peripheral portion 87 a collar shape. The first flange 79 may also be obtained by moulding or die-stamping.

The second flange 81 comprises a central portion 93, a peripheral portion 95 and a disc 97 connecting the central portion 93 to the peripheral portion 95.

The peripheral portion 95 of the second flange 81 supports the exterior edge 21 of the rim 7, the other seat surface 18 and the remaining portion of the bottom 20 of the rim 7. The second flange 81 is obtained, for example, by injecting plastic material. The second flange 81 then has low raw material and manufacturing costs. The second flange 81 may also be made of metal, like the first flange 79 or from a different material. The first flange 79 made of metal then has an improved resistance to impacts, for example in the event of projections of stones during the rolling of the machine.

The second flange 81 may take the form of a tire cover consolidated by inner reinforcement walls, or ribs, between which multiple cavities are left empty. The ribs give the second flange 81 a good mechanical strength, comparable to a solid plastic or metal part. They make it possible to ensure the necessary mechanical strength with little raw material. The volume occupied by the first flange 7 is mostly hollow.

The central portion 93 of the second flange 81 comprises a portion intended to house the rest of the bearing 91.

Once the tire 5 has been put on the rim 7, the first flange 79 and the second flange 81 support the tire 5, here each substantially for half. The radial force applied by the soil on the tire 5 is substantially distributed equivalently on the flanges 79 and 81.

The bearing 91 is placed straddling in a bore in two portions arranged in the central portions of the first flange 79 and of the second flange 81.

As the second flange is tightened on the first, the axial abutment surfaces 48 tend to move closer to one another. The engagement of the spacer 56 is continued and maintained in the lateral walls 51 of the chamber 25, due to the fact that the spacing of the axial abutment surfaces 48 in the axial direction of the body 3 is less than the spacing in this direction of the exterior surfaces 47 of the interior 35 and exterior 37 beads. By tightening, the tire 5 is compressed at its interior 35 and exterior 37 beads, while engaging these beads with the spacer 56. As the axial mounting clearance reduces between the tire 5 and the rim 7 and the axial compression of the tire 5 increases on the beads 35, 37, by tightening the first flange 79 on the second 81, the radial mounting clearance between the rim 7 and the tire 5 is also reduced, until cancelling out, as a result of the engagement of the spacer 56 on a frustoconical portion of the beads 35, 37. In other words, the protruding surfaces of the ends of the spacer 56 cooperate with the frustoconical shape of the beads 35, 37 there where the spacer 56 engages them, so as to ensure not only the axial blocking of the tire 5 on the body 3, but also a radial blocking. This happens without the axial abutment surfaces 48, or other surfaces of the rims 7, producing a locking by cooperation of shape with the beads 35, 37.

The wheel 1 is intended to be mounted in an agricultural tool, in such a way that the interior face 13 of the body 3 is partly at least facing a disc-shaped tool. The exterior face 15 of the body 3 is then oriented in a way opposite to this disc.

The rim 7 is of conventional type. This rim 7 has no surface that protrudes axially inward of a portion of the tire 5 radially more inward.

Figure 5:
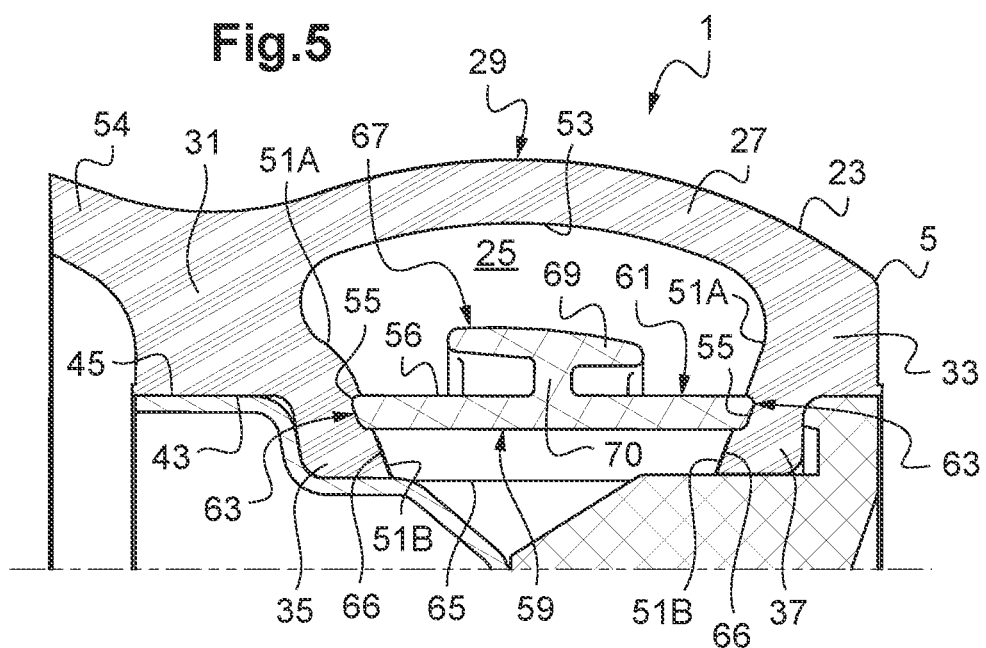
FIG. 5 shows an alternative embodiment of the wheel of FIG. 1, in a view similar to FIG. 4.

Reference is made to FIGS. 5 and 16.

One variant 1 of the wheel described in relation to FIGS. 1 to 4 firstly differs in that the interior sidewall 31 is substantially thicker than the exterior sidewall 33 whereas the homologous surface 45 of the interior edge 19 of the rim 7 is axially enlarged to correspond to the edge surface 43 of the interior edge 39 of the tire 5. This makes it possible to increase the resistance of the interior sidewall 31, in particular to wear, relative to the exterior sidewall 33. During work, the interior sidewall 31 is more exposed than the exterior sidewall 33. Furthermore, this wheel 1 is intended to work with a traverse angle relative to the direction of forward motion, an angle that exposes the interior sidewall 31. This extra thickness may reach 20 percent. This extra thickness of the interior sidewall 31 relative to the exterior sidewall 33 further increases the contact pressure on the homologous surface 45 and improves the sealing.

Over its first portion 51A, the lateral wall SI corresponding to the inner sidewall 31 extends according to a curved profile, from the corresponding circular groove 55, which prevents the stresses in the place for connecting the first portion 51A to the second portion SIB. This profile also increases the material mass that is above the homologous surface 45 of the interior edge 19 improving as much the sealing between this surface 45 and the bearing surface 43. This first portion 51A connects to the bottom 53 with a wide fillet.

Figure 4:
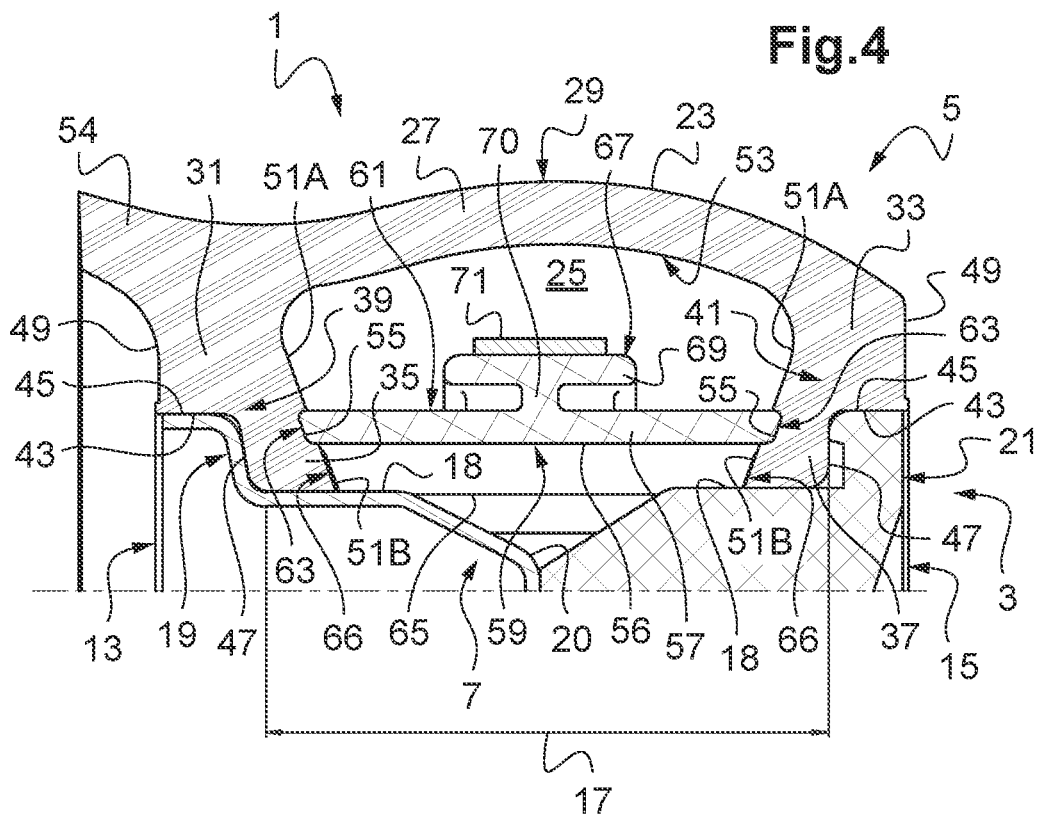
FIG. 4 shows a detail IV of FIG. 2.

Unlike the abutment surface of FIGS. 2 and 4, the abutment surface 67 extends here in an inclined way relative to the axial direction of the spacer 56. This makes it possible to compensate an inclination of the wheel during work. This abutment surface 67 is supported by a generally frustoconical secondary portion 69. Furthermore, the abutment surface 67 has a slight curve, when this surface is looked at from the exterior of the spacer 56. This curve ensures a harmonious contact between the abutment surface 67 and the band 27.

Figure 6:
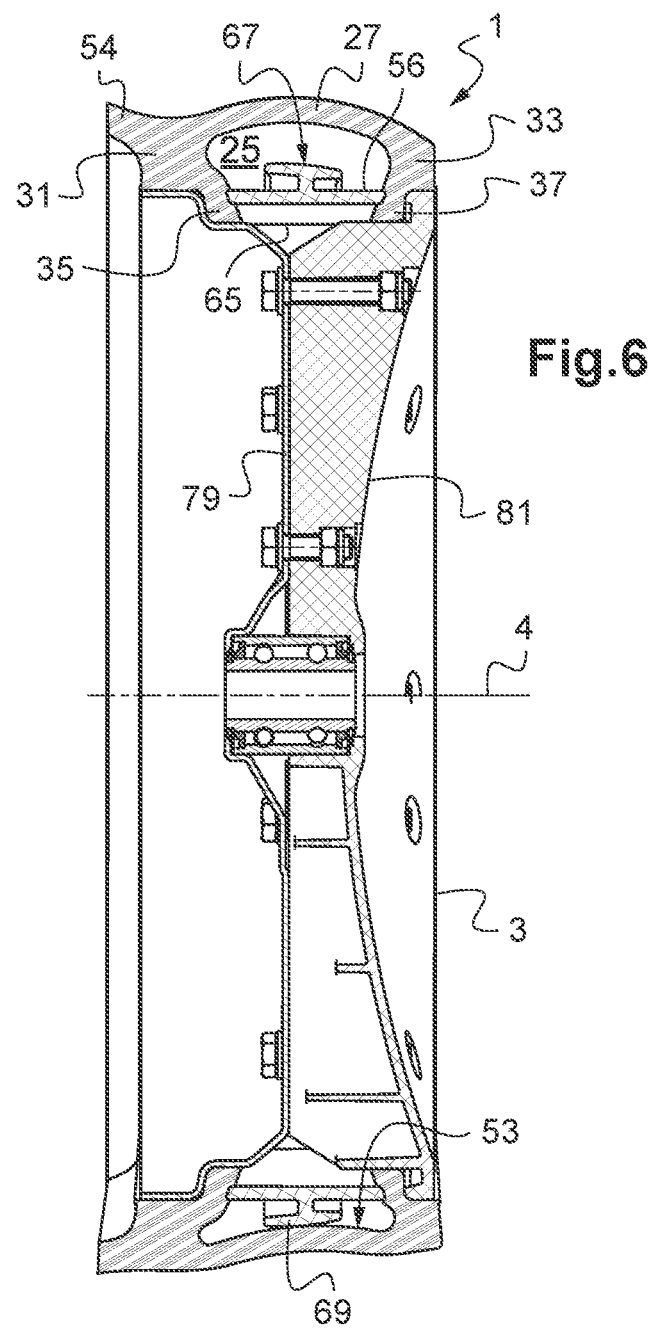
FIG. 6 shows the wheel of FIG. 5, in a view similar to FIG. 2.
Figure 7:
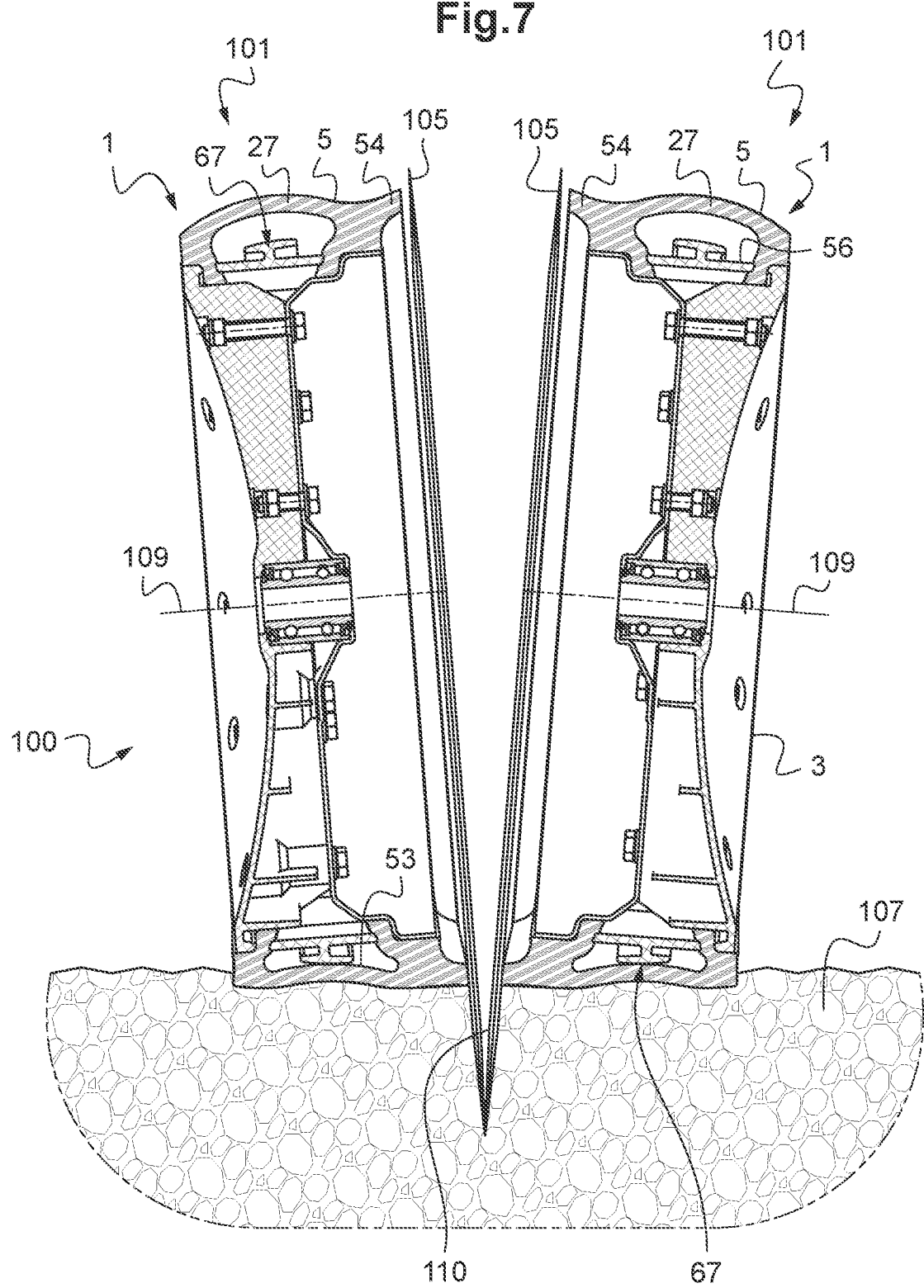
FIG. 7 shows an agricultural tool produced from the wheel of FIGS. 5 and 6.
Figure 8:
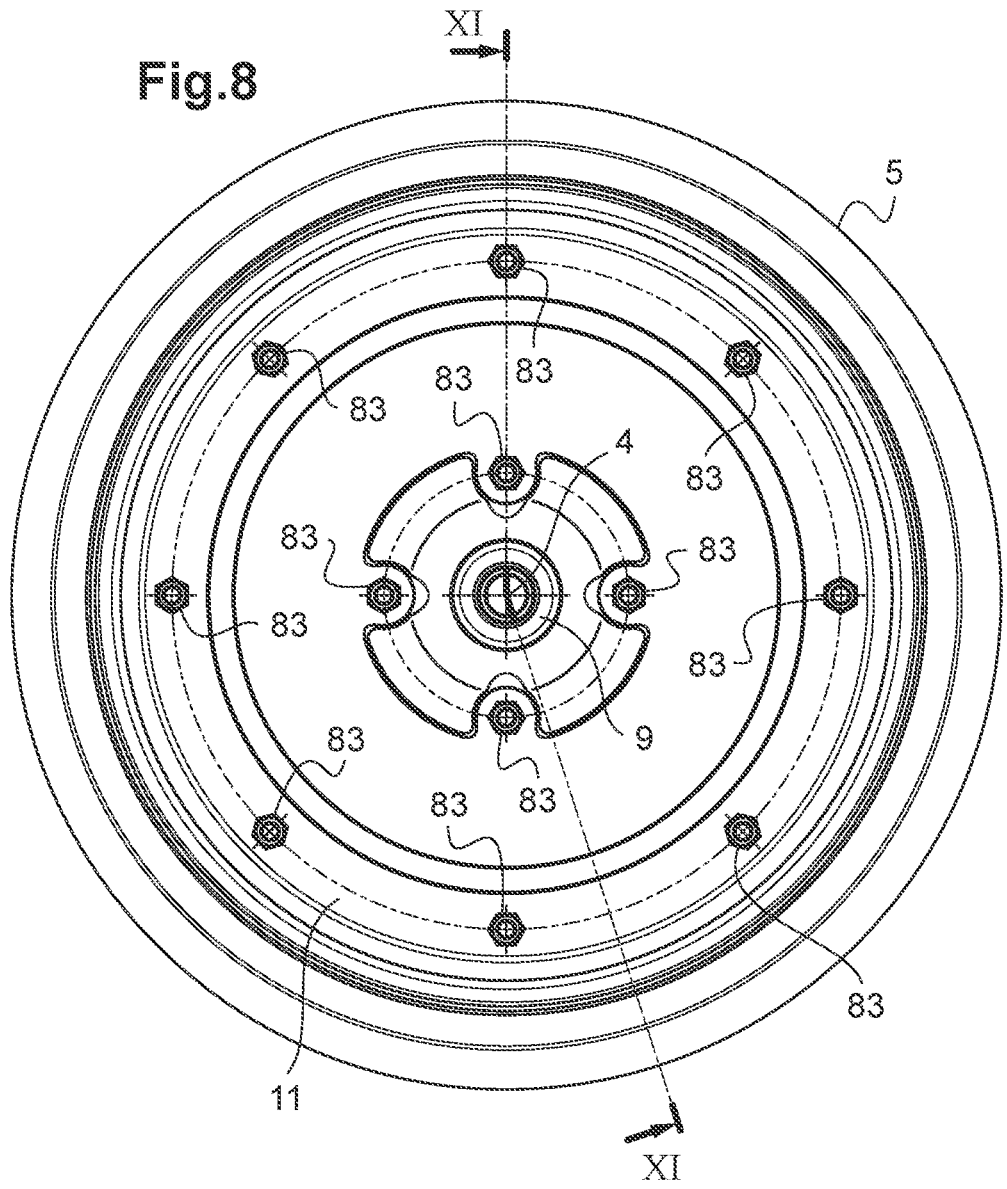
FIG. 8 shows another alternative embodiment of the wheel of FIG. 1, front view.
Figure 9:
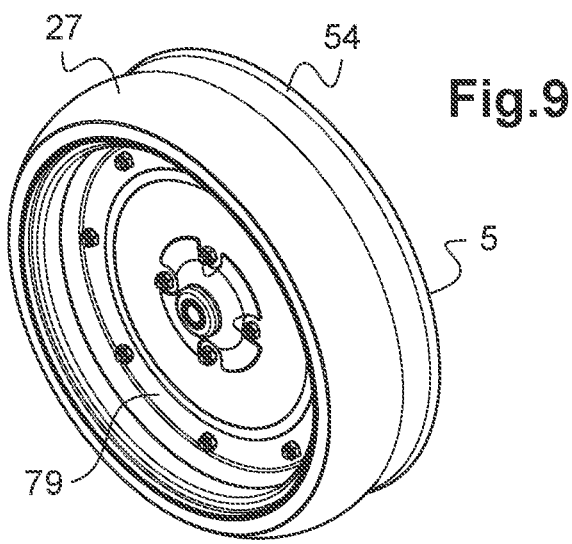
FIG. 9 shows the wheel of FIG. 8 in isometric perspective.
Figure 10:
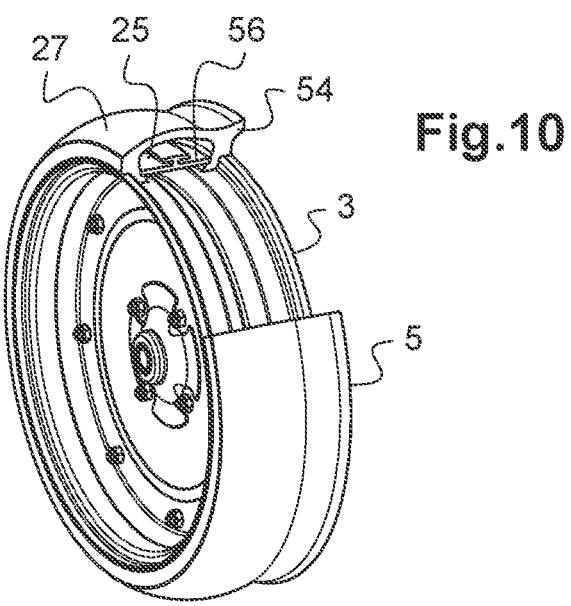
FIG. 10 shows the wheel of FIG. 8 in isometric perspective with a partially truncated tire.

Reference is made to FIGS. 6 and 7.

A seeder unit 100 comprises a pair of similar rotary tools 101, mounted symmetrically in relation to a vertical plane on a support not shown. Each tool 101 comprises a respective seeder disc 105, typically mounted free in rotation on the frame of a machine or of a tool towed/pushed by such a machine, and a wheel 1 of the type of the wheel described in relation to FIGS. 5 and 6, mounted freely in rotation about an axis 109, for example on an arm (not shown) that connects the wheel 1 to the frame in question. The disc 105 and the wheel 1 of a respective tool 101 are free to rotate one in relation to the other.

In each tool 101, the axis of rotation 109 of the wheel 1 is offset from the axis of rotation of the seeder disc 105. This off-centring comprises a non-zero vertical component so that the axis of rotation of the disc 105 is lower than that of the wheel 1. The off-centring in question further comprises a non-zero horizontal component so that the axis of rotation of the disc 105 is at the front of that of the wheel 1.

The discs 105 of the unit 100) are mounted in an inclined way in relation to a vertical plane, with a first angular toe, and to a plane of symmetry, with a second angular toe. These discs 105 move closer to one another in the direction of forward motion on the one hand and in a vertical downward direction, on the other hand. The unit 100 has a so-called "V" configuration relative to the vertical direction and to the direction of forward motion. The first toe angle and/or the second toe angle are for example close to 5°. The first toe angle may differ from the second.

The wheels 1 are oriented in a similar manner to the discs 105. The toe angle of the wheels 1, first and second, may differ from those of the discs 105. The inclination of the abutment surface 67 relative to the main portion of the spacer 56 is such that it compensates the inclination of the wheels 1 relative to the vertical plane. The secondary portion of the spacer 56 thus offers an abutment surface 67 that extends more or less horizontally when the wheel 1 is mounted on a tool of the type of the tool 101. This configuration is particularly interesting when this abutment surface 67 is intended to receive a pressure sensor. This sensor may measure a vertical force value, which facilitates the reading of the force in relation to a skew force.

When the unit 100 is working, the discs 105 penetrate the soil 107 so as to create thereby a furrow 110, intended for example to bury grains or seeds, whereas the unit 100 rests on the soil by means of wheels 100, in particular the tread 27 of the tire 5. The working depth of the discs 105 is fixed thanks to the wheels 1 and corresponds to the vertical offset of the axis of rotation 109 of the wheels 1 relative to that of the discs 105, that is to say the vertical component of the off-centring of these axes. The discs 105 may thus work the soil to a substantially constant depth, even when a field has denivelations.

The annular lip 54, which protrudes from the rest of the tire cover radially and axially outward of the tire 5 rubs against the proximal face of a neighbouring disc 105 by scraping it. This scraping has the effect of cleaning the discs 105 of anything that may have stuck to them, such as mud or debris for example.

The domed shape of the abutment surface 67 of the spacer 56 ensures a harmonious contact of this surface with the bond 27, which prevents this band from deteriorating.

The value measured by the sensor 71 makes it possible to characterise the penetration of the discs 105. In the case where the measured value is zero, or almost, the tire 5 does not deform, or deforms little, and the tread 27 does not touch the soil, at least not enough. This informs insufficient penetration of the discs 105 and the risk that the grains or the seeds are deposited on the soil, or at an insufficient depth. Knowing the force value applied to the tool in its entirety, it is further possible to deduce from the force measured by the sensor 71 the resulting force on the discs 105.

In the case of a tamping wheel, where the tire 5 is used to close back up the furrows, a low force value measured indicates that the furrow is not closed back up properly and that the grain remains visible.

Reference is made to FIGS. 8 to 14.

The wheel 1 that is shown therein differs from the wheel in FIGS. 1 to 4 firstly due to the fact that the body 3 consists of a first flange 79 and of a second flange 81 similar to one another.

As a result, the exterior edge 21 of the rim 7 is shaped in a similar manner to the interior edge 19. The tire 5 has in correspondence an exterior edge 41 shaped like its interior edge 39 and an exterior bead 37 similar to the interior bead 35. In particular, the exterior surface 47 of the exterior bead 37 is frustoconical and widens radially outward like the exterior surface 47 of the interior bead 35. The inclination of the frustoconical portions of the lateral walls 51 of the tire 5 is substantially greater than in the embodiment of FIGS. 1 to 4, for example with a half angle at the vertex close to 30 degrees. The interior bead 35 and the exterior bead 37 thus occupy a greater portion of the seat surfaces 18 of the rim 7, thus improving the holding of the tire 5 on the body 3. A greater volume of material is also jammed between the spacer 56 and the seats 18, which also improves the locking of the tire 5 on the body 3.

The abutment surface 67 has here a slight curve.

Reference is made to FIG. 15.

While keeping the interior 35 and exterior 37 beads mutually similar, the tire 5 may have frustoconical lateral walls 51 less inclined than that of FIG. 13 particularly, here with a half angle at the vertex close to 20 degrees.

Figure 17:
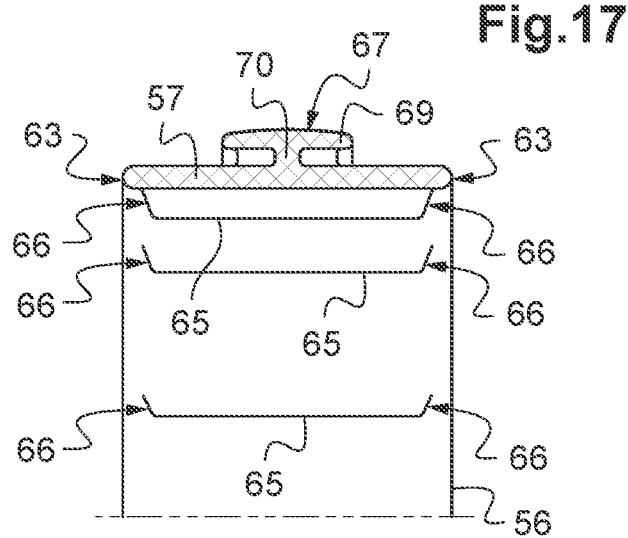
FIG. 17 shows a variant of the spacer of FIG. 14.
Figure 18:
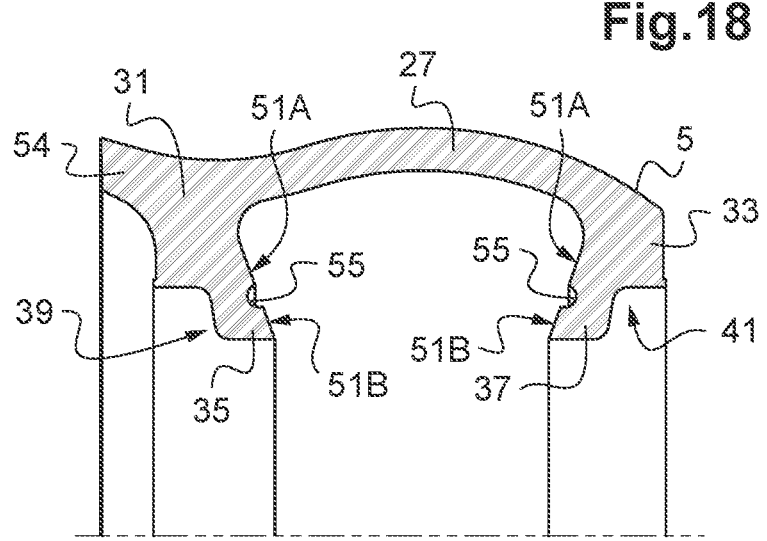
FIG. 18 shows a variant of the tire of FIG. 15.

Reference is made to FIGS. 17 and 18.

The profile of each groove 55 corresponds to the profile of the axial end portions of the spacer 56. Here the profile of these grooves has a semi-circle and not half-trapezium shape as in FIGS. 15 and 13 particularly. The shape of these axial end surfaces 63 corresponds to the shape of the bottom of the circular grooves 55, here semi-circular.

Reference is made to FIGS. 19 and 20.

Without departing from the scope of the invention, the spacer 56 may have 3 to a plurality of ribs. Preferably these ribs are evenly distributed angularly, at 120 degrees from one another in the case of 3 ribs or 20 degrees in the case of 18 ribs.

Reference is made to FIGS. 21 and 22.

The agricultural tool here takes the form of a roller 100 comprising a generally tubular support 102 on which is mounted a plurality of flexible tires 5 of the type of the flexible tire described in relation to FIGS. 12 and 13 particularly, with the exception that this tire 5 is devoid of lip of the type of the lip 54 and that the exterior surfaces 47 of the beads 35 are straight (extend in a plane perpendicular to the central axis of the tire 5). The spacer 56 is similar to the spacer described in relation to FIG. 13 particularly.

This spacer 56 engages, by its axial end portions, the lateral walls 51 of the chamber 25, at the second sections 51B.

The roller 100 further comprises a plurality of additional spacers 104, each additional spacer 104 being inserted between two mutually adjacent flexible tires 5. Each additional spacer 104 has a generally tubular appearance, with a circular profile. A plurality of ribs 106 protrudes radially inward of a radially inner face of the spacer 104. Each rib 106 extends generally according to an axial direction of the spacer 104. Each additional spacer 104 is mounted on an exterior surface of the support 102 by means of its ribs 106. By its axial ends, each additional spacer 104 presses against the beads 35 of two mutually adjacent tires 5, on the exterior surface 47 thereof. The profile of the longitudinal ends of the additional spacers 104 corresponds to the profile of the exterior surfaces 47 of the beads 35.

Here, this exterior surface 47 is smooth, but may, alternatively, have a circular groove, of profile corresponding to the axial end portions of the additional spacer, in such a way as to achieve an additional blocking by cooperation of shape. Here, the axial end portions of additional spacers 104 are devoid of protruding or recessing surfaces. These surfaces are flat and straight, i.e. they each extend in a plane perpendicular to the central axis of the additional spacer 104.

The tires 5 are mounted on the support 102 once the spacers 56 have been placed across the opening of the tire 5, if necessary engaged in grooves of the type of the circular grooves 55 described in relation to the preceding figures. The tires 5 and the spacers 56 are held in mutual engagement by means of the additional spacers 104 and of a pair of end flanges 108 mounted on the support 102. The flanges 108 have an edge 110 the shape of which corresponds to the exterior edge described in relation to FIG. 4 particularly.

The tightening of the flanges 110 on the support 102 ensures the axial compression of the tires 5 at their beads 35, compression needed to axially and radially hold them on the support 102, in a similar manner to that described above in the case of an agricultural tool in wheel form.

Figure 23:
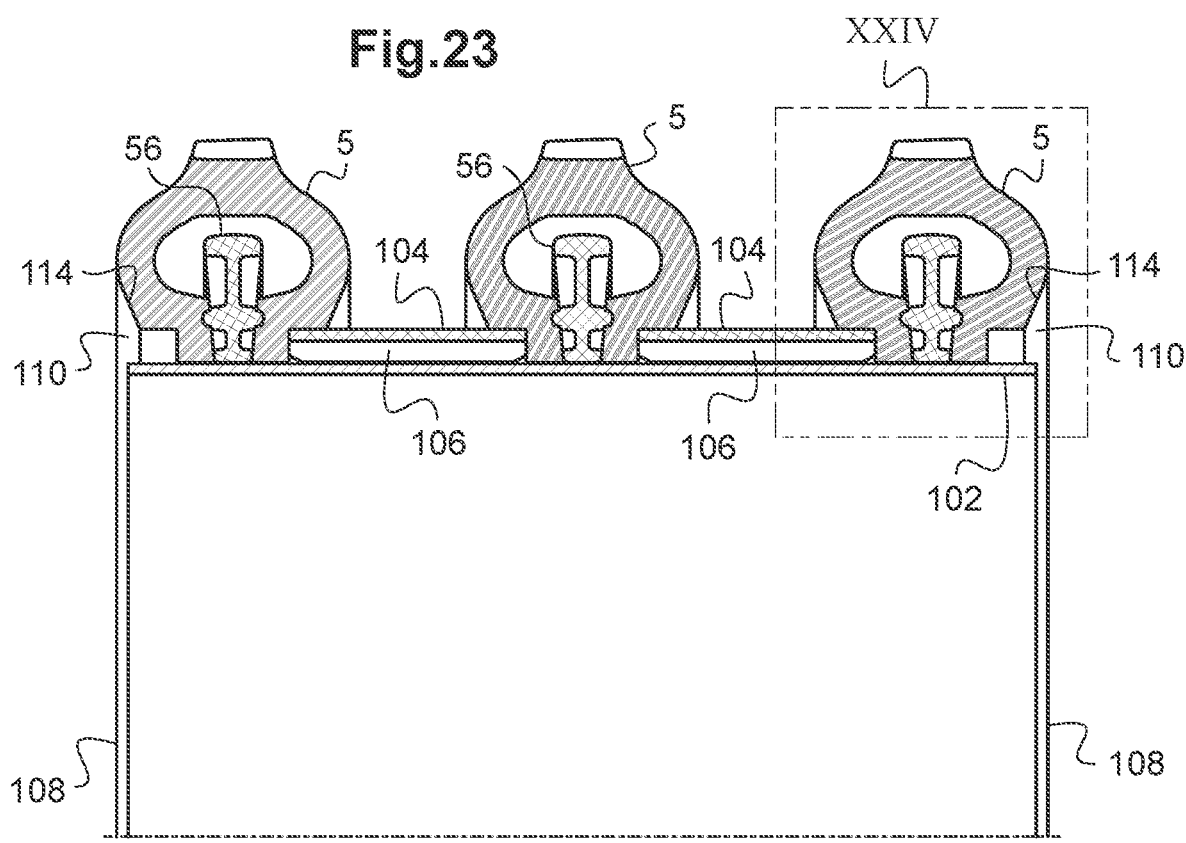
FIG. 23 shows a variant of the roller of FIG. 21.
Figure 24:
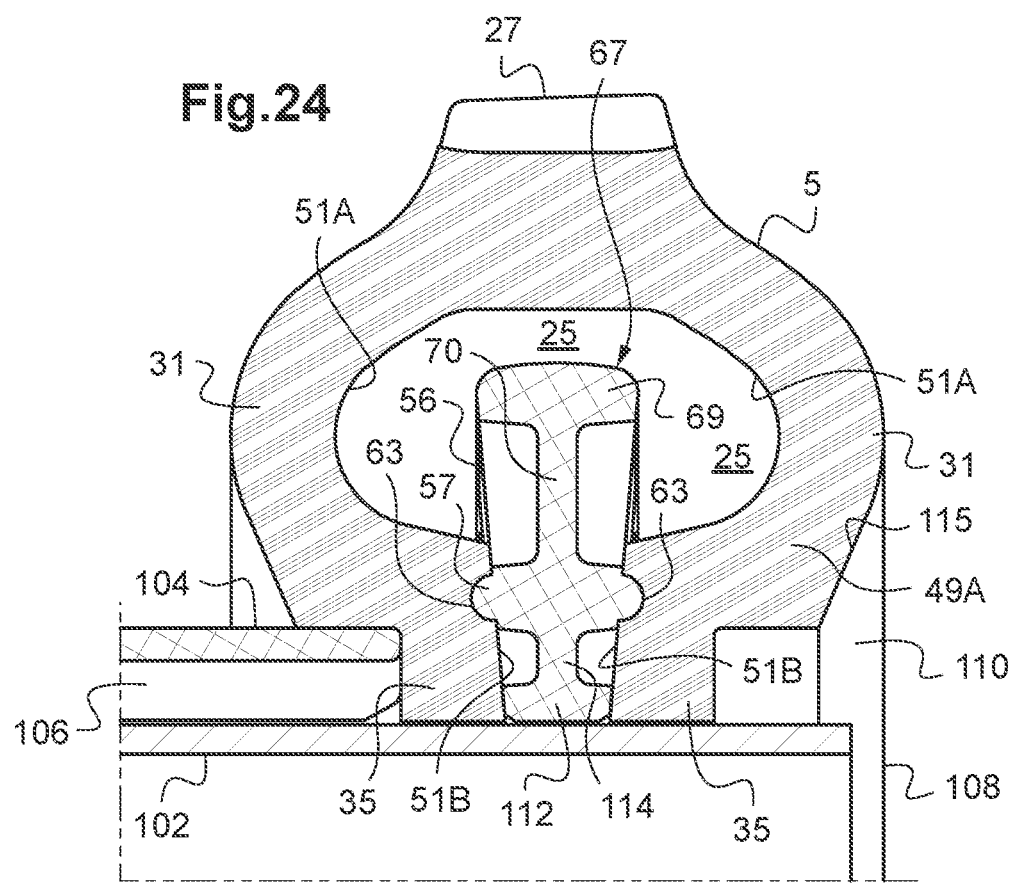
FIG. 24 shows a detail XXIV of the roller of FIG. 23.

Reference is made to FIGS. 23 and 24.

The roller 100 differs from the roller of FIG. 21 by the shape of the tires 5.

Each lateral wall 51 of the chamber 25 has a first section 51A with generally curved profile, practically semi-circular and a generally frustoconical second section SIB widening radially outward of the tire 5. Each tire 5 has on each of its second sections 51B a respective circular groove 55, here with a semi-circular profile. The groove 55 is optional.

The spacer 56 has a generally tubular main portion 57 the axial end portions of which are each shaped in a way corresponding to a respective circular groove 55. A portion of the end surfaces 63 of this main portion 57 engages in the circular grooves 55, whereas the rest of these surfaces 63 has a frustoconical profile the shape of which corresponds to that of the second section SI B, at least in the vicinity of the place of engagement of the spacer 56 with the lateral walls 51 of the chamber 25.

The spacer 56 has a tubular central portion 112 by means of which the spacer 56 is mounted on the exterior surface of the support 102. The central portion 112 connects to the main portion 57 by means of an annular rib 114, which may be discontinuous. The ends of the central portion 112 are here shaped in a manner corresponding to the profile of the beads 35, i.e. each with a frustoconical end surface.

The spacer 56 has a secondary portion 69 that protrudes into the chamber 25, at the first sections 51A of the lateral wall 51. This secondary portion 69 offers an abutment surface 67 for the tread 27 of the tire 5.

Unlike the flanges of FIG. 21, the flanges 108 have here an edge 110 that further comprises a frustoconical border 115 that offers a seat surface to a radial section 49A of corresponding shape of the exterior surface 49 of a sidewall 31.

For the tire 5, it is preferred to use a fairly flexible material, in the order of 50 Shore A in order to make it very deformable and prevent fouling of the area between the tires 5.

Figure 25:
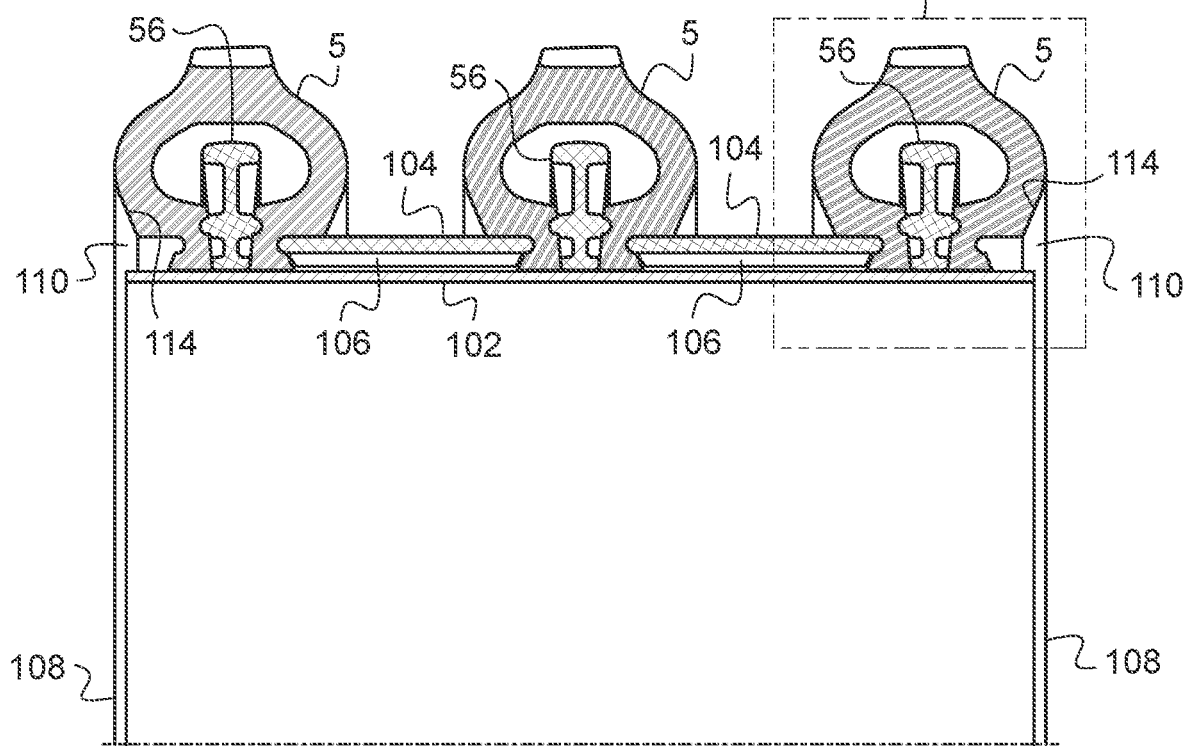
FIG. 25 shows a variant of the roller of FIG. 23.
Figure 26:
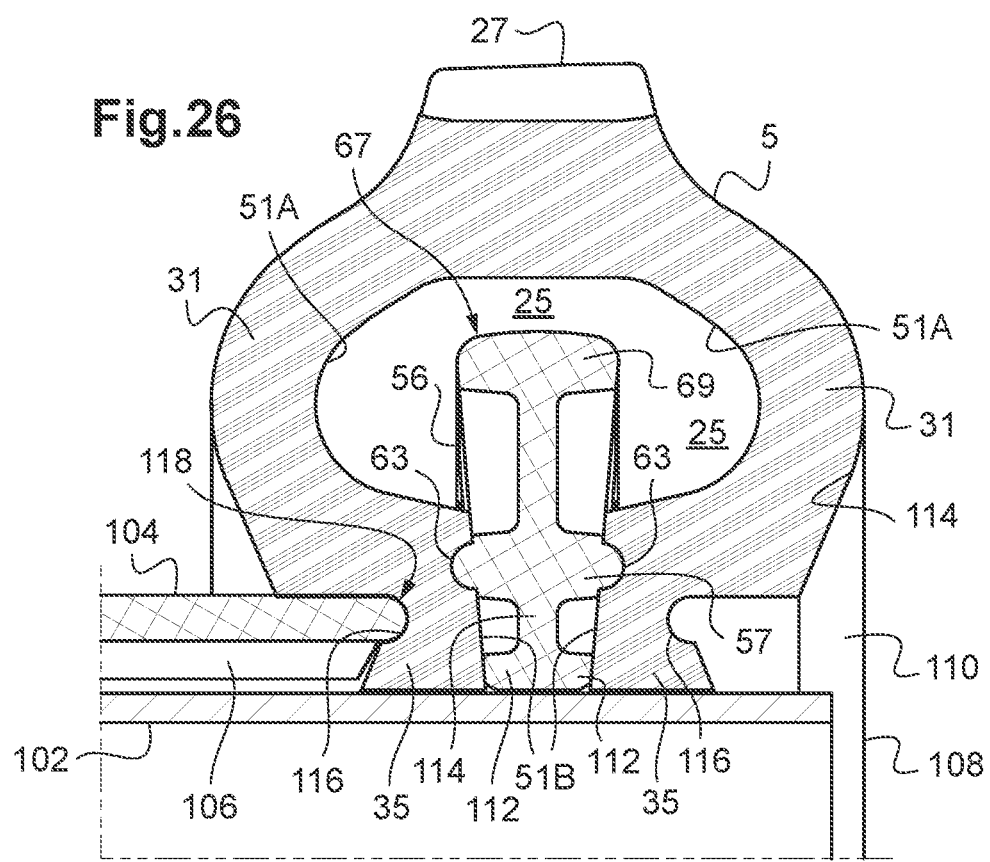
FIG. 26 shows a detail XXVI of the roller of FIG. 25.

Reference is made to FIGS. 25 and 26.

The roller 100 differs from the roller of FIG. 22 in that the exterior surface 47 of the beads 35, 37 is frustoconical and widens radially inward of the tire 5.

On these exterior surfaces 47 is arranged each time a circular groove 116 the profile of which corresponds to the profile of the axial end portions of the additional spacers 106. By these ends, the spacers 106 engage the beads 35 by cooperation of shape with the circular grooves 116.

Here, the axial end portions of the spacers 106 have an axially protruding end surface 118. These end surfaces 118 have here a semi-circular profile, but may, alternatively, be frustoconical, by analogy with the spacer of FIG. 14 for example. The axial end portions of the spacers 106 cooperate with the exterior surfaces 47 of the beads 35 in a similar manner to that described for the spacers 56 disposed across the opening of the tires 5.

The edges 110 of the flanges 108 are shaped in a way corresponding to the exterior surface 47 of the beads 35, 37.

A kit has just been described intended to form an agricultural tool from a wheel body or from a tubular support, this kit comprising a lexible tire having a hollow chamber and an inner surface around this hollow chamber. The flexible tire further has a circular opening on the hollow chamber and a pair of beads that border this circular opening and by means of which the flexible tire is mounted around the wheel body or the tubular support. The kit further comprising a spacer with at least a generally tubular portion. One at least of the beads has a circular groove open on the hollow chamber whereas the inner surface extends generally frustoconically, by widening radially outward of the flexible tire, over one portion at least of this bead that runs from the circular groove radially inward of the flexible tire. The spacer is shaped in such a way as to be placed across the opening of the flexible tire in such a way that an axial end portion of the generally tubular portion of the spacer engages in the circular groove.

One at least of the beads 35, 37 may have a circular groove 55 open on the hollow chamber 25 whereas the inner surface 51 extends generally frustoconically, by widening radially outward of the flexible tire 5, over one portion at least of this bead 35, 37 that runs from the circular groove 55 radially inward of the flexible tire 5, whereas the axial end portion of this spacer 56 engages in the circular groove 55.

Each bead 35, 37 may have a respective circular groove 55 open on the hollow chamber 25, whereas the inner surface 51 extends generally frustoconically widening radially outward of the flexible tire 5 over one portion at least of each of these beads 35, 37 that runs from the circular groove (55) radially inward of the flexible tire 5, and the spacer 56 may be shaped in such away as to be placed across the opening of the flexible tire 5 in such a way that axial ends of this spacer 56 each engage in a respective circular groove 51.

The inner surface 51 may extend generally frustoconically by widening radially outward of the flexible tire 5 over a portion that runs from the circular groove 55 radially outward of the flexible tire 5.

One at least of the circular grooves may have a profile of shape corresponding to a profile of one at least of the axial end portions of the spacer 56.

One at least of the circular grooves may have a generally frustoconical bottom that widens radially outward of the flexible tire 5.

An inclination of the generally frustoconical bottom relative to a radial direction may be close to an inclination of the inner surface relative to this radial direction, in the vicinity at least of the circular groove 55.

An inclination of one at least of the axial ends 63 of the spacer 56 may be close to the inclination of the inner surface 51 in the vicinity at least of the circular groove 55.

The circular grooves may appear optional. When the axial end portions of the tubular portion of the spacer have at least one surface the profile of which is axially protruding, the engagement of the spacer in the beads 35, 37 may result from a local deformation of the lateral wall 51 of the chamber, at the beads 35, 37 that shows a penetration of the ends of the spacer in these beads 35, 37.

In such a case, and in the case of FIG. 4 for example, it may be possible to obtain the same situation of the spacer 56 and of the tire 5, without the latter being provided with circular grooves 55.

The circular grooves 55 are of shallow depth, in the order of a few millimetres, for example one or two millimetres, and relatively narrow, so that these grooves may be seen as notches.

The invention is not limited to the examples of tools described above, only by way of example, but it encompasses all of the variants that may be envisaged by those skilled in the art within the scope of the claims below.

The exterior sidewall 33 and the interior sidewall 31 generally extend in the radial direction of the tire 9. Alternatively, one at least of the exterior sidewall 3 and of the interior sidewall 31 generally extends in a direction slightly inclined in relation to the radial direction, in the order of a few degrees and of 15 degrees at most.

This inclination may be positive, when the sidewall is spaced apart from the axially radial direction outward of the tire 5 as it moves away from the axis of the tire 5, or negative, when this spacing is carried out in a direction axially inward of the tire 5.

The spacer 56 may have axial end portions of shape different from one another.

One of the beads may be devoid of grooves, the spacer engaging only the other bead.

The pressure sensor may be disposed on the inner surface of the band 27, facing the abutment surface 67.

The inner surface 51 may extend, at least over the portion corresponding to the bead 35 or 37, with a half-angle at the vertex between approximately 15 degrees and 45 degrees, preferably between 15 and 35 degrees.

A rigid spacer has just been described supporting a pressure sensor in line with the tread. This arrangement of the sensor is not limited to the embodiments of the spacer described above. It applies to any agricultural tool of the type comprising a wheel body and a flexible tire mounted around the wheel body, the flexible tire comprising an opening on its interior face, and the tool further comprising a rigid spacer inserted into the opening and mounted on the rim, the spacer has a radially exterior face facing the tread and the spacer has a radially exterior surface forming abutment for the flexible tire, the tool further comprising a pressure sensor, the sensor being fastened on the abutment surface facing the vertex of the tread or on the tread facing the abutment surface.

This abutment surface may be inclined in relation to the axial direction of the spacer. This abutment surface may be domed radially outward of the spacer. This surface may be generally frustoconical and widen radially in an axially outward direction.

An agricultural tool 1, 100 is also described comprising a wheel body 3 or a roller support 102, a flexible tire 5 having a hollow chamber 25 and an inner surface 51 around this hollow chamber 25, the flexible tire 5 further having a circular opening on the hollow chamber 25 and a pair of beads 35, 37 bordering this circular opening and by means of which the flexible tire 5 is mounted around the wheel body 3 or the roller support 102, the tool further comprising a spacer 56 at least partially tubular with two axially opposite end faces, characterised in that at least over one portion corresponding to at least one of the beads 35, 37, the inner surface 51 extends generally frustoconically, by widening outward of the flexible tire 5, and one at least of the end faces of the spacer has at least one axially protruding surface, the spacer 56 being placed across the opening of the flexible tire 5 in such a way that the protruding surface 63 engages the inner surface 51 in an area of said portion corresponding to the bead 35, 37.

The tire 5 may be axially stressed at the beads 35,37. This axial stress may result, in part at least, in an axial deformation of the tire 5, at the beads 35, 37 in the order of 1 to 5 percent.

Figure 27:
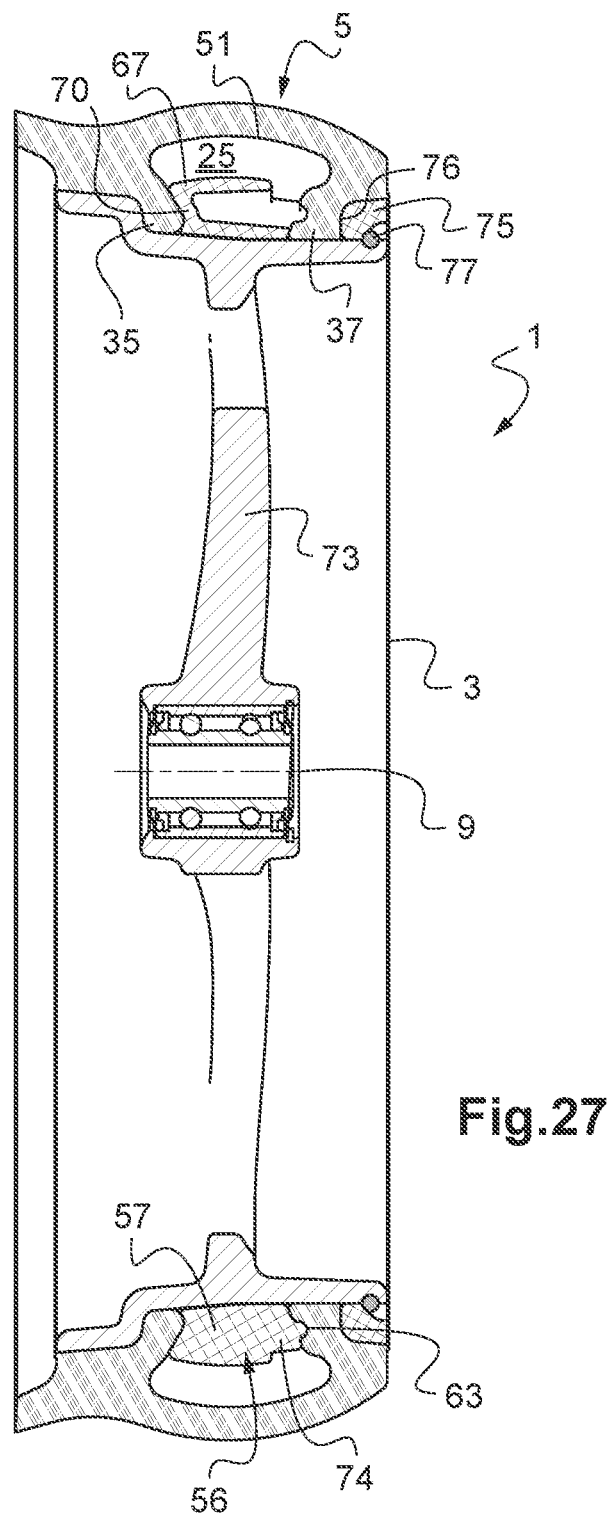
FIG. 27 shows an alternative embodiment of the wheel of FIG. 1, in a view similar to FIG. 2.
Figure 28:
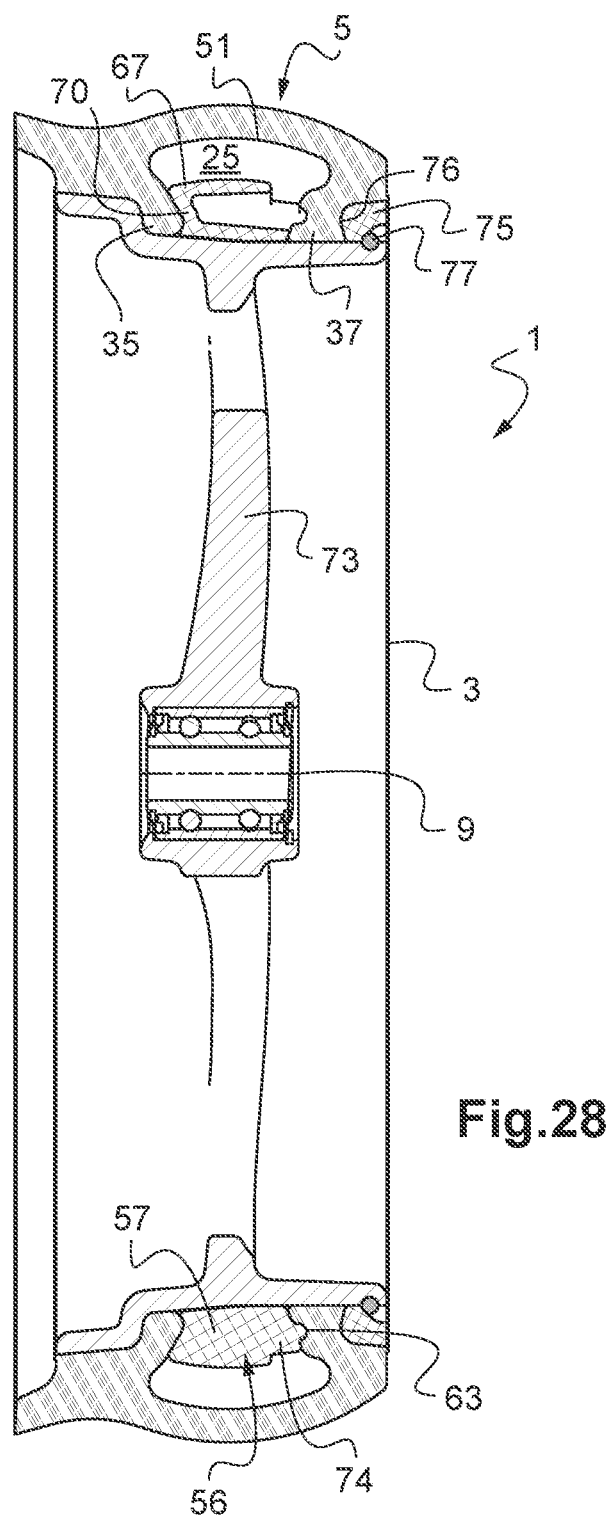
FIG. 28 is similar to FIG. 27, for another wheel variant.

Reference is made to FIGS. 27 and 28.

One variant of the wheel 1 described in relation to FIGS. 1 to 4 differs therefrom particularly in that the tire 5 and the spacer 56 are mounted on a wheel body 3 comprising a main one-piece portion comprising the hub 9 and the disc of which consists of bars 73 each connecting the hub 9 to the rim.

The body 3 of the wheel 1 comprises a circular flange 75 shaped as an exterior edge similar to the second edge 21 of the preceding figures. The flange 75 is mounted on the wheel body 3 in such a way as to hold thereto the tire 5 and the spacer 56. The wheel 1 also comprises an elastic closure ring 77, received in a groove (not referenced) of the wheel body 3. The ring 77 holds the flange 75 on the wheel body 3. The circular flange 75 is positioned against the exterior bead 37 of the tire 5 and has an axially interior surface 76 in cooperation of shape with the exterior edge of this exterior bead 37. The elastic ring 77 is positioned against the circular flange 75.

The axially interior surface 76 of the circular flange 75 may have a straight profile, as in FIG. 27, or a frustoconical profile centred on the axis of the hub 9 and widening radially inward as in FIG. 28. In this case, the circular flange 75 acts as a wedge, which blocks the exterior edge of the exterior bead 37 radially against the outside.

The tire 5 has a circular groove on the interior surface of the exterior bead 37. On its portion radially lower than the circular groove, the exterior bead 37 has a frustoconical inner surface.

The spacer 56 has an axial end surface directed towards the interior bead 35 which is shaped as a peripheral rib 70. The peripheral rib 70 is of generally frustoconical profile, centred on the axis of the hub 9 and widening in an inward radial direction. The rib 70 is in cooperation of shape with the inner surface of the interior bead 35, at least over a portion thereof in contact with the rib 70. The peripheral rib 70 supports an abutment surface 67 of generally cylindrical profile, which protrudes radially into the chamber 25.

The spacer 56 further has a plurality of ribs 74. The ribs 74 are evenly distributed angularly around the circumference of the outer face of the spacer 56. Each rib 74 has a surface 63 that protrudes from the axial end face of the spacer 56 directed towards the exterior bead 37 and to engage the inner surface of the exterior bead 37, here in its circular groove.

The wheel body 3 may be made of spheroidal graphite cast iron or aluminium for example. The circular flange 75 may be made of plastic material. The elastic ring 77 may be made of steel.

The assembly of the wheel 1 is firstly carried out by slight compression of the tire 5, of the spacer 56 and of the circular flange 75 on the wheel body, then by positioning the elastic ring 77 against the circular flange 75.

This variant does not require screws for the mounting. This makes it possible to simplify and speed up the assembling. This also reduces the number of asperities likely to retain soil or plants during use of the wheel 1.

The invention claimed is:

1. A kit intended to form an agricultural tool from a wheel body or a roller support, the kit comprising:
    a flexible tire having a hollow chamber and an inner surface around the hollow chamber, the flexible tire further having a circular opening on the hollow chamber and a pair of beads bordering the circular opening and by means of which the flexible tire is mounted around the wheel body or the roller support, and
    a spacer at least partially tubular with two axially opposite end faces,
    wherein at least over one portion corresponding to at least one of the beads, the inner surface extends generally frustoconically, by widening outward of the flexible tire, and one at least of the end faces of the spacer has at least one axially protruding surface, the spacer being shaped in such a way as to be placed across the opening of the flexible tire in such a way that the protruding surface is able to engage the inner surface in an area of said portion corresponding to the bead, and
    wherein the bead has a circular groove open on the hollow chamber and said area comprises the circular groove.

2. The kit according to claim 1, wherein each end face of the spacer having at least one axially protruding surface further has an axially recessed surface, and the axially recessed surface is shaped in a way corresponding to the inner surface over one portion at least of the bead which is radially below said area.

3. The kit according to claim 2, wherein the axially recessed surface of the spacer is shaped in a way corresponding to the inner surface over one portion of the bead that runs, from said area, radially inward of the flexible tire.

4. The kit according to claim 3, wherein the axially recessed surface of the spacer is shaped in a way corresponding to the inner surface over one portion of the bead (that runs up to a radial end of the bead.

5. The kit according to claim 2, wherein the axially recessed surface is generally frustoconical and widens radially outward of the spacer.

6. The kit according to claim 1, wherein the spacer has a radially interior face, and the spacer comprises a plurality of axial ribs that protrudes radially from the interior face of the spacer and by means of which the spacer is mounted around the wheel body or the roller support.

7. The kit according to claim 6, wherein each axial rib has an axial end shaped in a way corresponding to the inner surface over a portion thereof corresponding to a section of the bead that is radially below said area.

8. The kit according to claim 1, wherein the circular groove is shaped in a way corresponding to the axially protruding surface of the spacer.

9. The kit according to claim 1, wherein the axially protruding surface is generally frustoconical or of semi-circular profile.

10. The kit according to claim 1, wherein the inner surface extends, at least over the portion corresponding to the bead, with a half-angle at the vertex between approximately 15 degrees and 45 degree.

11. The kit according to claim 1, wherein the spacer has a radially interior surface axially longer than an axial dimension of the opening of the tire.

12. The kit according to claim 1, wherein the spacer comprises a generally tubular portion supporting the axial end faces and an abutment surface for the tire, the abutment surface protruding radially from said tubular portion.

13. The kit according to claim 12, wherein the abutment surface extends generally frustoconically by widening in an axial direction.

14. The kit according to claim 12, further comprising a pressure sensor being attached to the abutment surface.

15. The kit according to claim 1, wherein one at least of the beads has an exterior surface with a profile that extends generally radially.

16. An agricultural tool comprising:
a wheel body or a roller support,
a flexible tire having a hollow chamber and an inner surface around his the hollow chamber, the flexible tire further having a circular opening on the hollow chamber and a pair of beads the circular opening and by means of which the flexible tire is mounted around the wheel body or the roller support, and
a spacer at least partially tubular with two axially opposite end faces,
wherein at least over one portion corresponding to at least one of the beads, the inner surface extends generally frustoconically, by widening outward of the flexible tire, and one at least of the end faces of the spacer has at least one axially protruding surface, the spacer being placed across the opening of the flexible tire in such a way that the protruding surface engages the inner surface in an area of said portion corresponding to the bead, and
wherein the bead has a circular groove open on the hollow chamber and said area comprises the circular groove.

17. The agricultural tool according to claim 16, wherein the tire is axially stressed at the beads.

18. The agricultural tool according to claim 17, wherein the axial stress results, in part at least, from an axial deformation of the tire, at the beads in the order of 1 to 5 percent.

19. The agricultural tool according to claim 17, wherein the wheel body comprises a main one-piece portion, comprising a hub and a disc connecting the hub to a rim, and a circular flange which is mounted on the main portion, the flange being shaped as an exterior edge of the wheel body in cooperation of shape with an edge of the tire.

* * * * *